US012665143B2

(12) United States Patent　(10) Patent No.:　US 12,665,143 B2

Ho et al.　(45) Date of Patent:　Jun. 23, 2026

(54) BACKLIGHT MODULE FOR LIGHTING KEYBOARD

(71) Applicant: Darfon Electronics Corp., Taoyuan City (TW)

(72) Inventors: Hsin-Cheng Ho, Taoyuan City (TW); Wen-Ming Hsu, Taoyuan City (TW)

(73) Assignee: Darfon Electronics Corp., Taoyuan City (TW)

( * ) Notice: Subject to any disclaimer, the term of this patent is extended or adjusted under 35 U.S.C. 154(b) by 0 days.

(21) Appl. No.: 19/319,999

(22) Filed: Sep. 5, 2025

(65) Prior Publication Data

US 2026/0004980 A1　Jan. 1, 2026

Related U.S. Application Data

(63) Continuation-in-part of application No. 19/316,037, filed on Sep. 2, 2025, which is a continuation-in-part (Continued)

(30) Foreign Application Priority Data

Feb. 20, 2025　(TW) ................................. 114106250

(51) Int. Cl.
*H01H 13/00*　(2006.01)
*F21V 8/00*　(2006.01)
(Continued)

(52) U.S. Cl.
CPC ......... *H01H 13/023* (2013.01); *G02B 6/0035* (2013.01); *G02B 6/0085* (2013.01); (Continued)

(58) Field of Classification Search
CPC .. G06F 3/0202; H01H 13/023; G02B 6/0035; G02B 6/0085
See application file for complete search history.

(56) References Cited

U.S. PATENT DOCUMENTS 7,847,204 B2 * 12/2010 Tsai ...................... H01H 13/83
200/313
9,182,533 B2　11/2015 Yao et al.
(Continued)

FOREIGN PATENT DOCUMENTS

CN 　　　 201174339 Y 　* 12/2008
CN 　　　 203377146 U 　 1/2014
(Continued)

*Primary Examiner* — Gerald J Sufleta, II

(57) ABSTRACT

A lighting keyboard comprises a first key and a second key, with a gap region between them. A backlight module for the lighting keyboard comprises a lighting board having a light emitting unit, a light guide panel, and a shielding sheet having a light-reducing pattern corresponding to the first key, which are stacked from top to bottom. The backlight module has a colored material layer on the shielding sheet or the light guide panel and vertically overlapping with the gap region. A light of the light emitting unit is guided by the light guide panel to pass through the light-reducing pattern and form a first color light upward from an inner outlet of the first key, and further to pass through the colored material layer and form a second color light different from the first color light upward from an inner outlet and a boundary of the second key.

20 Claims, 26 Drawing Sheets

Related U.S. Application Data of application No. 18/780,572, filed on Jul. 23, 2024, now Pat. No. 12,518,936, which is a continuation of application No. 18/398,285, filed on Dec. 28, 2023, now Pat. No. 12,154,729.

(60) Provisional application No. 63/695,911, filed on Sep. 18, 2024, provisional application No. 63/444,573, filed on Feb. 10, 2023.

(51) Int. Cl.
 *G06F 3/02* (2006.01)
 *H01H 13/02* (2006.01)

(52) U.S. Cl.
 CPC ..... *G06F 3/0202* (2013.01); *H01H 2219/056* (2013.01); *H01H 2219/06* (2013.01); *H01H 2219/062* (2013.01)

(56) References Cited

U.S. PATENT DOCUMENTS

| | | | | |
|---|---|---|---|---|
| 12,140,793 | B1 * | 11/2024 | Chang | G02B 6/0055 |
| 2012/0160653 | A1 * | 6/2012 | Chao | H01H 13/83 200/5 A |
| 2016/0299278 | A1 * | 10/2016 | Liang | G02B 6/0035 |
| 2022/0246371 | A1 * | 8/2022 | Ku | H01H 13/705 |

FOREIGN PATENT DOCUMENTS

| | | | |
|---|---|---|---|
| JP | 2008130506 | A | 6/2008 |
| TW | I269993 | B | 1/2007 |
| TW | M449281 | U1 | 3/2013 |
| TW | I494960 | B | 8/2015 |
| TW | M622001 | U | 1/2022 |
| TW | 202211277 | A | 3/2022 |
| TW | I756738 | B | 3/2022 |

* cited by examiner

LKB

KS-1

LKB

LKB

BACKLIGHT MODULE FOR LIGHTING KEYBOARD

This application claims the benefit of U.S. Provisional Application No. 63/695,911, filed on Sep. 18, 2024 and the benefit of Taiwan application Serial No. 114106250, filed on Feb. 20, 2025. This application is a continuation-in-part (CIP) application of application Ser. No. 19/316,037 filed Sep. 2, 2025, which is a continuation-in-part (CIP) application of application Ser. No. 18/780,572, filed Jul. 23, 2024, which is a continuation application of U.S. application Ser. No. 18/398,285, filed Dec. 28, 2023 (now patented as U.S. Pat. No. 12,154,729, issued Nov. 26, 2024), which claims the benefit of U.S. Provisional Application No. 63/444,573, filed on Feb. 10, 2023 and the benefit of Taiwan application Serial No. 112145095, filed on Nov. 22, 2023. The contents of these applications are incorporated herein by reference.

FIELD OF THE INVENTION

The invention relates to a backlight module for a lighting keyboard.

DESCRIPTION OF THE PRIOR ART

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. When a conventional luminous keyboard is used in a thin computing device, a large number of components are stacked in a small space of the computing device, thereby raising a prominent heat dissipation problem. Further, with advancements in technology, computing devices are also equipped with specific functions such as artificial intelligence (AI)-assisted features. Thus, there is a need to improve heat dissipation efficiency of the computing devices and be responsive to the specific function, and keyboard modules embedded them need to be correspondingly adjusted as well. In addition, if there is a need to achieve a backlight effect with multiple light colors on a conventional lighting keyboard, it is currently necessary to configure multiple light-emitting units that can emit different light colors in the keyboard. However, this method has the problem of a more complex process and higher cost.

SUMMARY OF THE INVENTION

The invention is directed to provide a backlight module for a lighting keyboard, to solve the aforementioned problems.

According to an aspect of the invention, a backlight module for a lighting keyboard is provided. The backlight module comprises a lighting board, light guide panel and a shielding sheet. The shielding sheet, the light guide panel and the lighting board are stacked from top to bottom. The lighting keyboard comprises a first key and a second key, with a gap region between the first key and the second key. The lighting board has a light emitting unit. The shielding sheet has a light-reducing pattern corresponding to the first key for blocking light. The backlight module has a colored material layer disposed on the shielding sheet or the light guide panel and overlapping with the gap region in a vertical direction. The light of the light emitting unit is guided by the light guide panel to pass through a side of the light-reducing pattern and form a first color light upward from an inner outlet of the first key. The light of the light emitting unit is further guided by the light guide panel to pass through the colored material layer and form a second color light different from the first color light upward from an inner outlet and a boundary of the second key.

According to another aspect of the invention, a backlight module for a lighting keyboard is provided. The backlight module comprises a lighting board, light guide panel and a shielding sheet. The shielding sheet, the light guide panel and the lighting board are stacked from top to bottom. The lighting keyboard comprises a first key and a second key. The backlight module has at least two penetration channels respectively and symmetrically corresponding to the first key and the second key and penetrating the lighting board, the light guide panel and the shielding sheet. A periphery of each of at least two penetration channels is provided with one light-reducing pattern for blocking light. At least two diffusion patterns are disposed adjacent to the at least two light-reducing patterns to guide light to illuminate the first key and the second key. The at least two light-reducing patterns and the at least two diffusion patterns respectively form at least two heat-reducing optical pattern groups. The at least two heat-reducing optical pattern groups respectively corresponding to the first key and the second key have identical patterns. The backlight module has a colored material layer disposed on the shielding sheet or the light guide panel and vertically overlapping with the second key. A light from the light emitting unit is guided by the light guide panel to pass through a side of the light-reducing pattern corresponding to the first key and form a first color light upward from an inner outlet of the first key. The light from the light emitting unit is further guided by the light guide panel to pass through the colored material layer and a side of the light-reducing pattern corresponding to the second key and form a second color light different from the first color light upward from an inner outlet and a boundary of the second key.

According to yet another aspect of the invention, a backlight module for a lighting keyboard is provided. The backlight module comprises a lighting board, light guide panel and a shielding sheet. The shielding sheet, the light guide panel and the lighting board are stacked from top to bottom. The lighting board has a light emitting unit. The shielding sheet has a light-reducing pattern corresponding to the first key for blocking light. The backlight module has a colored material layer vertically overlapping with the second key. A light from the light emitting unit is guided by the light guide panel to pass through a side of the light-reducing pattern and form a first color light from an inner outlet of the first key. The light from the light emitting unit is further guided by the light guide panel to pass through the colored material layer and form a second color light different from the first color light upward from an inner outlet of the second key.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
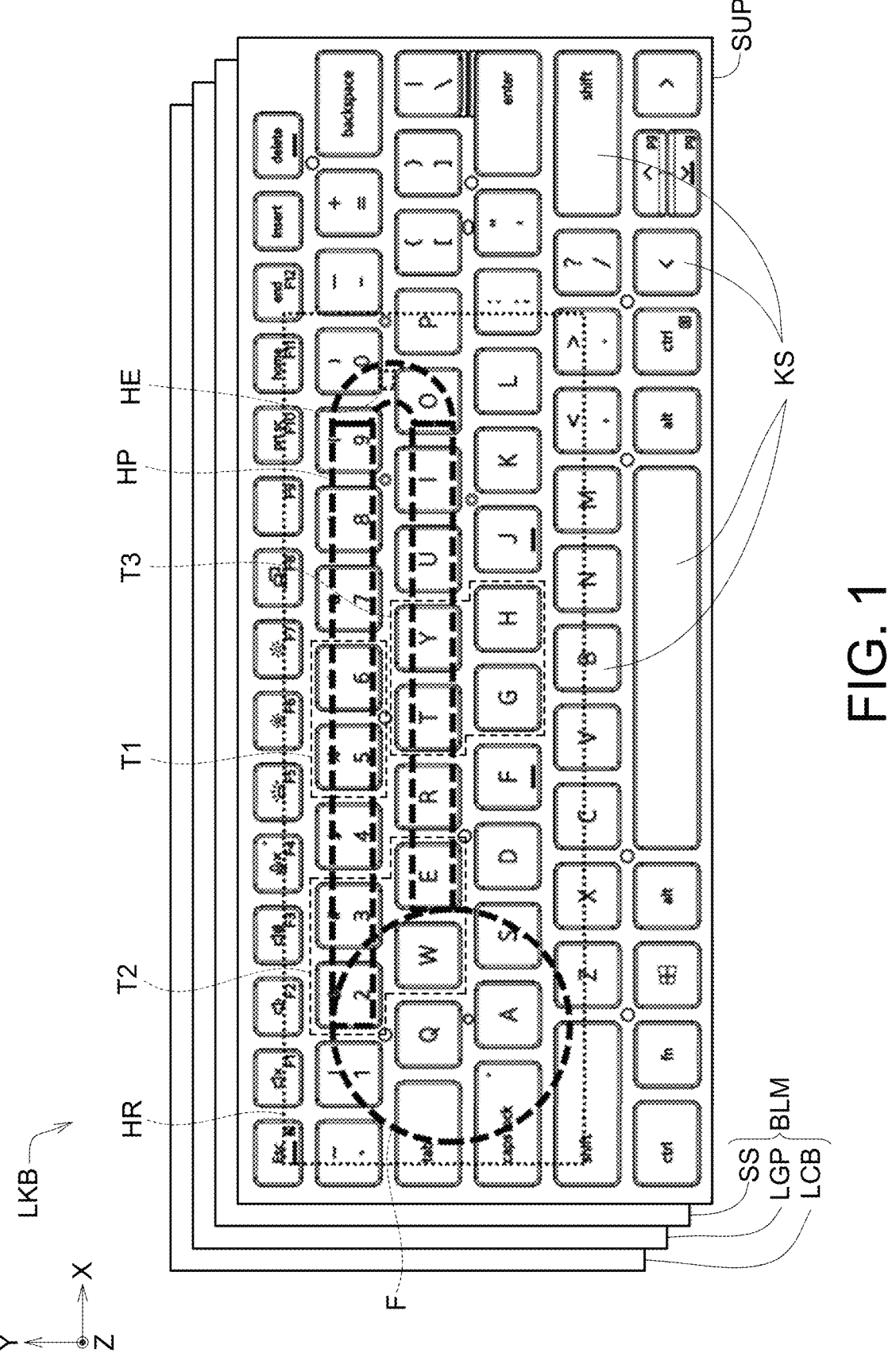
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

Figure 2:
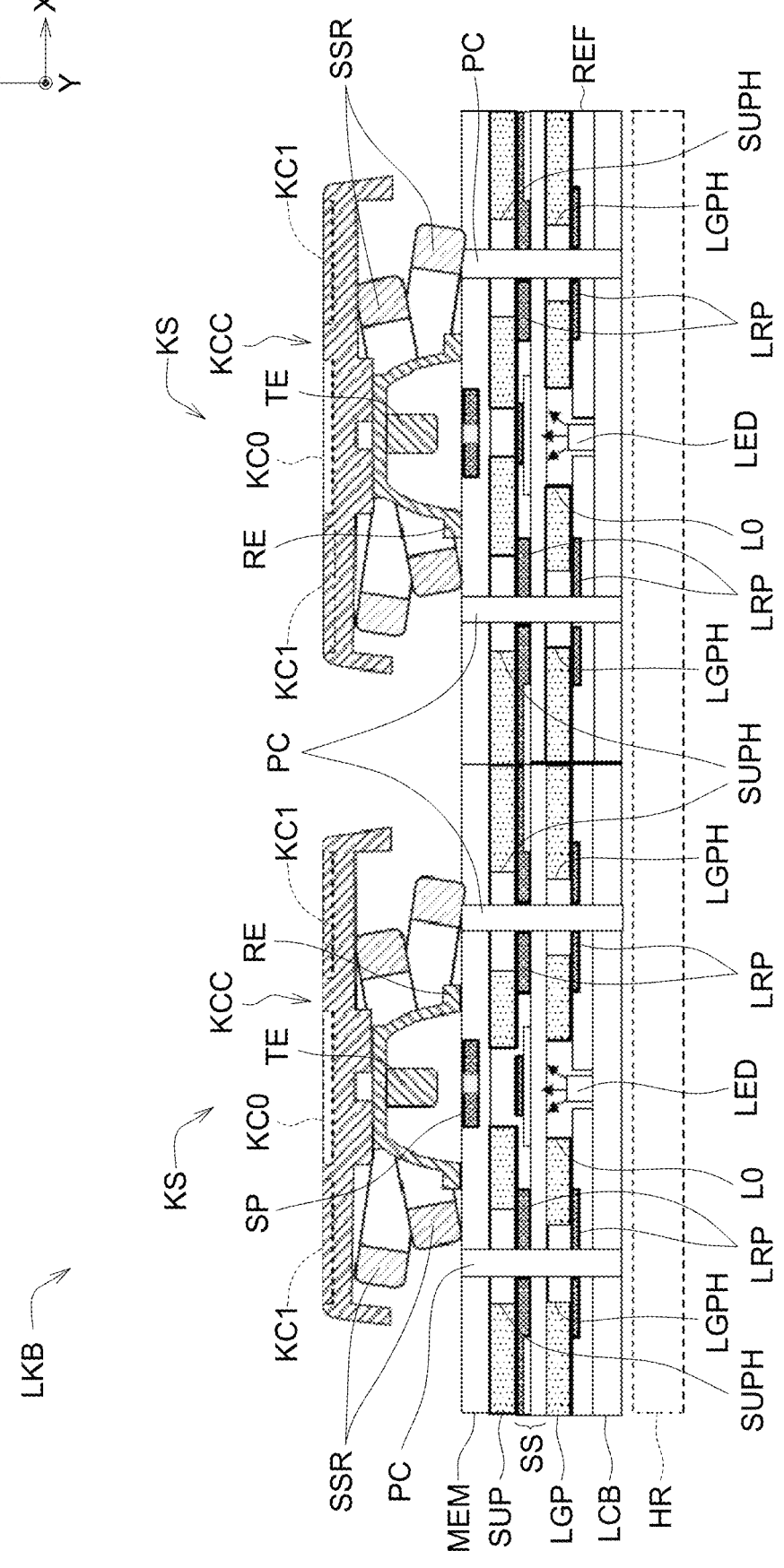
FIG. 2 is a partial sectional view illustrating the lighting keyboard shown in FIG. 1.
Figure 3:
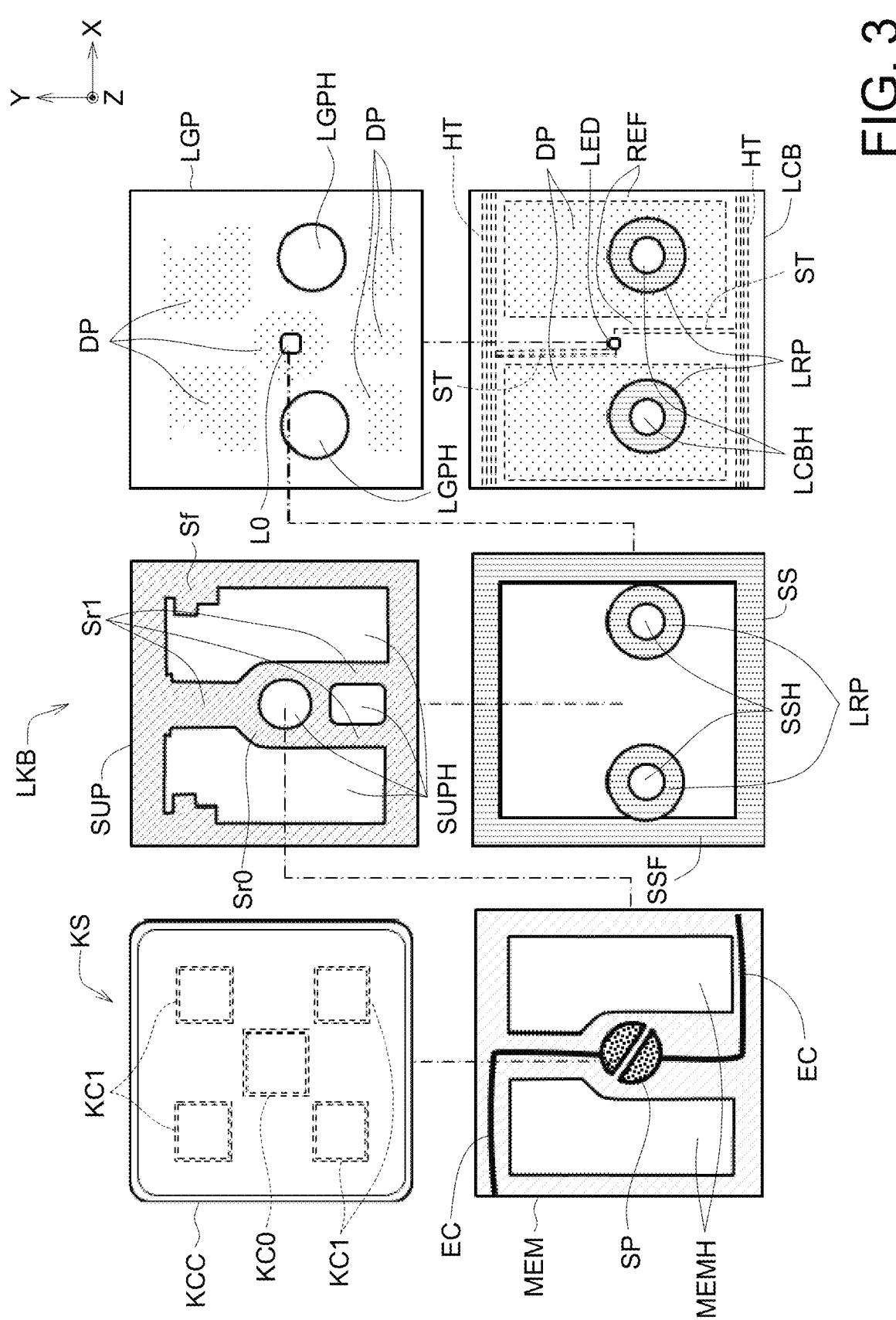
FIG. 3 is a partial exploded view illustrating the lighting keyboard shown in FIG. 1.

As shown in FIG. 1, there are a heating element HE (e.g. integrated circuit or electronic element), a fan F and a heat pipe HP below the lighting keyboard LKB. Heat dissipation are needed at a heat region HR where the heating element HE, the fan F and the heat pipe HP overlap with the lighting keyboard LKB. The lighting keyboard LKB comprises a backlight module BLM and a plurality of heat-dissipating keys KS. A support plate SUP is disposed on the backlight module BLM and the heat-dissipating keys KS are disposed on the support plate SUP. In general, the heat-dissipating keys KS may comprise square keys and multiple keys (e.g. space key). It should be noted that the number, size and arrangement of the heat-dissipating keys KS may be determined according to practical applications, so the invention is not limited to the embodiment shown in the figure. The backlight module BLM comprises a lighting board LCB, a light guide panel LGP and a shielding sheet SS. The light guide panel LGP is configured in optical communication with at least one light emitting unit LED on the lighting board LCB, as shown in FIG. 2 and FIG. 3. The lighting board LCB, the light guide panel LGP and the shielding sheet SS are stacked up and down (or may be referred to as stacked vertically), namely the light guide panel LGP is disposed on the lighting board LCB and the shielding sheet SS is disposed on the light guide panel LGP.

Further referring to FIGS. 2 to 3, FIG. 2 is a partial sectional view illustrating the lighting keyboard LKB shown in FIG. 1, FIG. 3 is a exploded view illustrating layers of a single heat-dissipating key KS of the lighting keyboard LKB shown in FIG. 1, wherein a support mechanism SSR, a trigger element TE and a restoration member RE are omitted in FIG. 3.

In this embodiment, each heat-dissipating key KS on the lighting keyboard LKB corresponds to at least one light emitting unit (e.g. LED) on the lighting board LCB of the backlight module BLM. In other possible embodiments, each heat-dissipating key KS on the lighting keyboard LKB corresponds to a light bar on the lighting board LCB of the backlight module BLM. The backlight module BLM may have a plurality of penetration channels PC respectively and symmetrically to correspond to the heat-dissipating keys KS, so as to allow hot air and cold air to flow and exchange through penetration channels PC. The penetration channels PC penetrate the lighting board LCB, the light guide panel LGP and the shielding sheet SS. When the lighting board LCB is a small-sized light bar, the penetration channels PC may not be able to penetrate the lighting board LCB. In such case, the penetration channels PC penetrate the shielding sheet SS, the light guide panel LGP and a reflective layer REF on top of the light bar functioning as the lighting board LCB. As shown in FIG. 2, two penetration channels PC are provided below a single heat-dissipating key KS, but the invention is not so limited. The penetration channels PC also penetrate the key circuit board MEM, the support plate SUP and a reflective layer REF. That is to say, the penetration channel PC is formed by stacking the perforations of layers of the key circuit board MEM, the support plate SUP, the shielding sheet SS, the light guide panel LGP, the reflective layer REF and the lighting board LCB in the Z direction, wherein these perforations at least partially overlaps one another. The perforation of the light guide panel LGP can be larger than the perforations of the reflective layer REF and the shielding sheet SS. The penetration channels PC are configured to be heat-dissipating channels for the heat region HR.

The heat-dissipating key KS comprises a keycap KCC, the support mechanism SSR, the key circuit board MEM and the support plate SUP. The keycap $K_{CC}$ is disposed with respect to the support plate SUP. The keycap $K_{CC}$ has an inner outlet KC0, such that the light emitted by a light emitting unit LED may be projected from the inner outlet KC0 to illuminate the character on the keycap KCC. The keycap $K_{CC}$ further has a plurality of outer outlets KC1 being adjacent to the inner outlet KC0. As shown in FIG. 2, the positions of the outer outlets KC1 correspond to the positions of the penetration channels PC, such that the penetration channels PC can be disposed below an opaque area, thereby reducing the upward light leakage. The support mechanism SSR is disposed between the keycap $K_{CC}$ and the support plate SUP. When the keycap $K_{CC}$ is pressed, the keycap $K_{CC}$ will move vertically toward the support plate SUP along with the support mechanism SSR. Furthermore, the restoration member RE may be further disposed between the keycap $K_{CC}$ and the support plate SUP, wherein the restoration member RE may be, but is not limited to, a rubber dome. The keycap KCC, the support mechanism SSR, the restoration member RE, the key circuit board MEM and the support plate SUP may be mainly formed by a non-reflective or low-reflective material or a light-absorbing material, thereby reducing the downward light reflection.

The key circuit board MEM is disposed above the backlight module BLM. Furthermore, a switch pad SP corresponding to the trigger element TE of the heat-dissipating key KS may be provided on the key circuit board MEM, wherein the switch pad SP may be, but is not limited to, a membrane switch. In this embodiment, the key circuit board MEM comprises an electric circuit portion EC, a plurality of membrane holes MEMH and the switch pad SP. The membrane hole MEMH constitutes a part of the penetration channel PC. The switch pad SP is connected to the electric circuit portion EC and is located between the membrane holes MEMH. Furthermore, the key circuit board MEM can be coated with a light-absorbing material around the penetration channel PC, thereby reducing the upward light leakage.

Each of the heat-dissipating keys KS comprises a part of the support plate SUP. In this embodiment, the support plate SUP may include a surrounding rib Sr0, a plurality of bridge ribs Sr1 and a support frame Sf, wherein the bridge ribs Sr1 connect the surrounding rib Sr0 and the support frame Sf, and there are a plurality of support plate holes SUPH between the bridge ribs Sr1, the surrounding rib Sr0 and the support frame Sf. The support plate holes SUPH on two sides are a part of the penetration channel PC. The switch pad SP of the key circuit board MEM is disposed with respect to a support plate hole SUPH in the center of the support plate SUP, such that the switch pad SP may partially enter the support plate hole SUPH in the center of the support plate SUP without interfering with the shielding sheet SS and the light emitting unit LED below the shielding sheet SS.

The shielding sheet SS is disposed below the support plate SUP. IN this embodiment, the shielding sheet SS has a plurality of shielding sheet holes SSH, a plurality of light-reducing patterns LRP and a shielding frame SSF, with the rest of the shielding sheet SS remaining a rectangular light permeable area surrounded by the shielding frame SSF. The rectangular light permeable area has four corners corresponding to the four corners of shielding frame SSF and to the four corners of the keycap KCC. The light permeable area allow light to pass through upwards and illuminate the keycap KCC. The shielding sheet holes SSH are respectively located in the light-reducing patterns LRP, and the shielding frame SSF corresponds to the support frame Sf of the support plate SUP. The shielding sheet hole SSH constitutes a part of the penetration channel PC. The light-reducing pattern LRP of the shielding sheet SS is provided at periphery of each penetration channel PC for blocking light. The light-reducing pattern LRP can be a ring-shaped black ink being coated on the top surface and/or the bottom surface of the shielding sheet SS.

The light guide panel LGP is disposed below the shielding sheet SS. In this embodiment, the light guide panel LGP has a light guide hole L0, a plurality of light guide panel holes LGPH and a plurality of diffusion patterns DP. The light emitting unit LED is located in the light guide hole L0. The top surface and/or the bottom surface of the light guide panel LGP close to the light guide hole L0 may have adhesive around the light guide hole L0 to adhere the shielding sheet SS and/or the lighting board LCB respectively. The position of the light guide panel hole LGPH corresponds to the position of the shielding sheet holes SSH and constitutes a part of the penetration channel PC. The diffusion patterns DP may be formed by microstructure regions, and the positions thereof correspond to the positions of the support plate holes SUPH, and the light permeable area of shielding sheet SS so as to guide the light transmitted in the light guide panel LGP to emit out upward. From top view in the Z direction, the diffusion patterns DP of the light guide panel LGP can be provided near the light-reducing pattern LRP of the shielding sheet SS to guide the light of the light emitting unit LED to illuminate the corresponding heat-dissipating key KS. The diffusion patterns DP of the light guide panel LGP each is configured at a position corresponding to the four corners of shielding frame SSF, the four corners of the light permeable area of shielding sheet SS, and corresponding to the four corners of the keycap KCC, thereby facilitating the light uniformity along the peripheral of keycap KCC, including four edges and four corners. Furthermore, either realizing the light-reducing pattern LRP by a ring-shaped black ink coated on the top surface or the bottom surface of the light guide panel LGP at periphery of the penetration channel PC, or coating a light-absorbing material on the hole wall of the light guide panel hole LGPH, or providing adhesive on the top surface and the bottom surface of the light guide panel hole LGPH near periphery of the penetration channel PC can all reduce the upward or downward light leaking from the light guide panel LGP in the penetration channel PC.

The lighting board LCB is disposed below the light guide panel LGP and may include the reflective layer REF on top of the lighting board LCB. In this embodiment, the lighting board LCB comprises the light emitting unit LED, a plurality of lighting board holes LCBH, a plurality of light-reducing patterns LRP, a plurality of diffusion patterns DP, a plurality of main traces HT and a plurality of sub-traces ST. The light-reducing patterns LRP may be realized on the top surface of lighting board LCB, or on the top surface of reflective layer REF, especially when lighting board LCB is a small-sized light bar. The light emitting unit LED is connected between two sub-traces ST, and the light emitting unit LED is connected between two main traces HT through the two sub-traces ST. In this embodiment, the main traces HT and the sub-traces ST constitute the lighting circuit of the light emitting unit LED, the main trace HT may be a main drive trace, and the sub-trace ST may be a sub-drive trace. The light emitting unit LED may be a white LED or a combination of RGB LEDs according to practical applications. In general, the main trace HT has a larger cross-sectional area and may cross a plurality of heat-dissipating keys KS. The position of the lighting board hole LCBH corresponds to the positions of the light guide panel hole LGPH and the shielding sheet holes SSH, and constitutes a part of the penetration channel PC. The light-reducing pattern LRP can be a ring-shaped black ink being formed in the reflective layer REF to be disposed at periphery of the penetration channel PC. The diffusion patterns DP may also be formed by the microstructure regions and can be formed in the reflective layer REF, and the diffusion patterns DP are disposed near the light-reducing pattern LRP, so as to guide the light of the light emitting unit LED to illuminate the corresponding heat-dissipating key KS. The diffusion patterns may be formed on the light guide panel LGP and/or the lighting board LCB.

Figure 4:
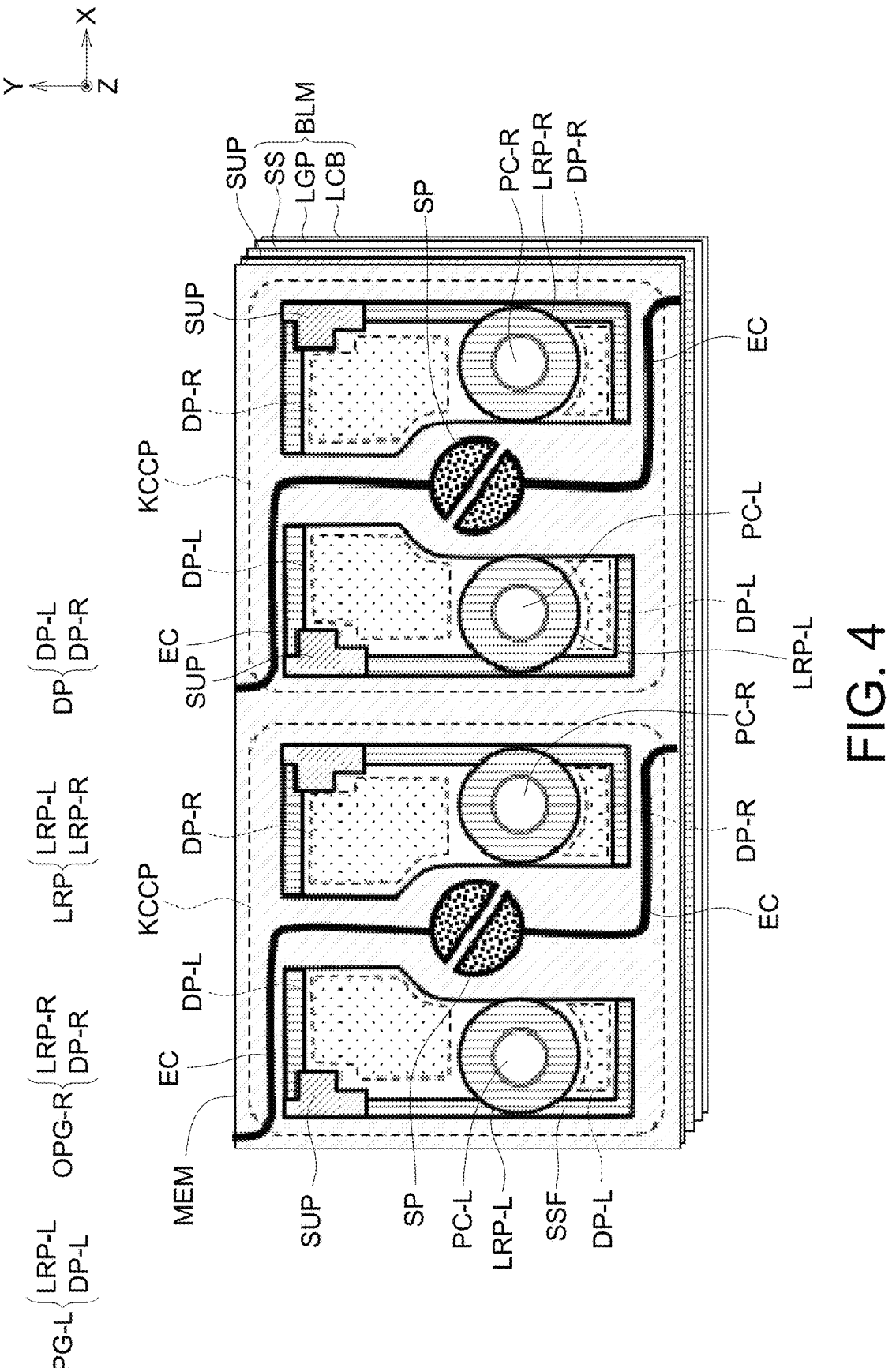
FIG. 4 is a partial top view illustrating the lighting keyboard shown in FIG. 1.

Further referring to FIG. 4, FIG. 4 is a top view illustrating a partial region T1 of the lighting keyboard LKB shown in FIG. 1, wherein the keycap KCC, the support mechanism SSR, the trigger element TE and the restoration member RE are omitted in FIG. 4.

Two heat-dissipating keys KS in the partial region T1 respectively have a keycap projected area KCCP of the keycap KCC, and each electric circuit portion of the key circuit board MEM extends across a range of the keycap projected area KCCP. Moreover, as shown in FIGS. 3 and 4, a rib portion (comprising the surrounding rib Sr0 and the bridge ribs Sr1) of the support plate SUP extends across the range of the keycap projected area KCCP. Corresponding to a single heat-dissipating keys KS, the penetration channel PC may include a left penetration channel PC-L and a right penetration channel PC-R. Two left penetration channels PC-L symmetrically correspond to two heat-dissipating keys KS and penetrate the lighting board LCB, the light guide panel LGP and the shielding sheet SS. Two right penetration channels PC-R also symmetrically correspond to the two heat-dissipating keys KS and penetrate the lighting board LCB, light guide panel LGP and shielding sheeting SS. Each of the two left penetration channels PC-L is provided with a left light-reducing pattern LRP-L at their periphery. Two left diffusion patterns DP-L are provided on the upper side and the lower side of each left light-reducing pattern LRP-L. Each of the two right penetration channels PC-R is provided with a right light-reducing pattern LRP-R at its periphery. Two right diffusion patterns DP-R are provided on the upper side and the lower side of each right light-reducing pattern LRP-R. That is, the light-reducing pattern LRP may include the left light-reducing pattern LRP-L and the right light-reducing pattern LRP-R to correspond to a single heat-dissipating key KS, and the diffusion pattern DP may include the left diffusion pattern DP-L and the right diffusion pattern DP-R to correspond to a single heat-dissipating key KS. Two diffusion patterns DP are provided near each of light-reducing patterns LRP. From top view in the Z direction, each of the light-reducing patterns LRP is located between two adjacent diffusion patterns DP.

The left light-reducing pattern LRP-L and the left diffusion pattern DP-L may constitute a left heat-reducing optical pattern group OPG-L, and the right light-reducing pattern LRP-R and the right diffusion pattern DP-R may constitute a right heat-reducing optical pattern group OPG-R. In this embodiment, the backlight module BLM has two penetration channels PC (i.e. one left penetration channel PC-L and one right penetration channel PC-R) to correspond to each heat-dissipating key KS. The left heat-reducing optical pattern group OPG-L and the right heat-reducing optical pattern group OPG-R, corresponding to each heat-dissipating key KS, are symmetrically located on opposite sides of each keycap projected area KCCP. In this embodiment, the two left heat-reducing optical pattern groups OPG-L corresponding to the two heat-dissipating keys KS have identical patterns, and the two right heat-reducing optical pattern groups OPG-R corresponding to the two heat-dissipating keys KS also have identical patterns. In practical applications, the electric circuit portion EC of the key circuit board MEM board of a square key may not be light-transparent and is not suitable to be above the diffusion pattern DP, so a longitudinal extending part of the electric circuit portion EC is preferably located between the left heat-reducing optical pattern group OPG-L and the right heat-reducing optical pattern group OPG-R corresponding to a single heat-dissipating key KS.

In practical applications, the rib portion (comprising the surrounding rib Sr0 and the bridge ribs Sr1) of the support plate SUP of a square key may not be light-transparent and is not suitable to be above the diffusion pattern DP, so the surrounding rib Sr0 and the bridge ribs Sr1 of the support plate SUP are preferably located between the left heat-reducing optical pattern group OPG-L and the right heat-reducing optical pattern group OPG-R corresponding to a single heat-dissipating key KS. That is, from top view in the Z direction, the left light-reducing pattern LRP-L and the left diffusion pattern DP-L are located on the same side of the electric circuit portion EC and on the same side of the rib portion (comprising the surrounding rib Sr0 and the bridge ribs Sr1) of the support plate SUP; the right light-reducing pattern LRP-R and the right diffusion pattern DP-R are located on the same side of the electric circuit portion EC and on the same side of the rib portion (comprising the surrounding rib Sr0 and the bridge ribs Sr1) of the support plate SUP. Moreover, from top view in the Z direction, the left light-reducing pattern LRP-L and the right light-reducing pattern LRP-R are located on opposite sides of the electric circuit portion EC and on opposite sides of the rib portion (comprising the surrounding rib Sr0 and the bridge ribs Sr1) of the support plate SUP; the left diffusion pattern DP-L and the right diffusion pattern DP-R are located on opposite sides of the electric circuit portion EC and on opposite sides of the rib portion (comprising the surrounding rib Sr0 and the bridge ribs Sr1) of the support plate SUP.

Figure 5:
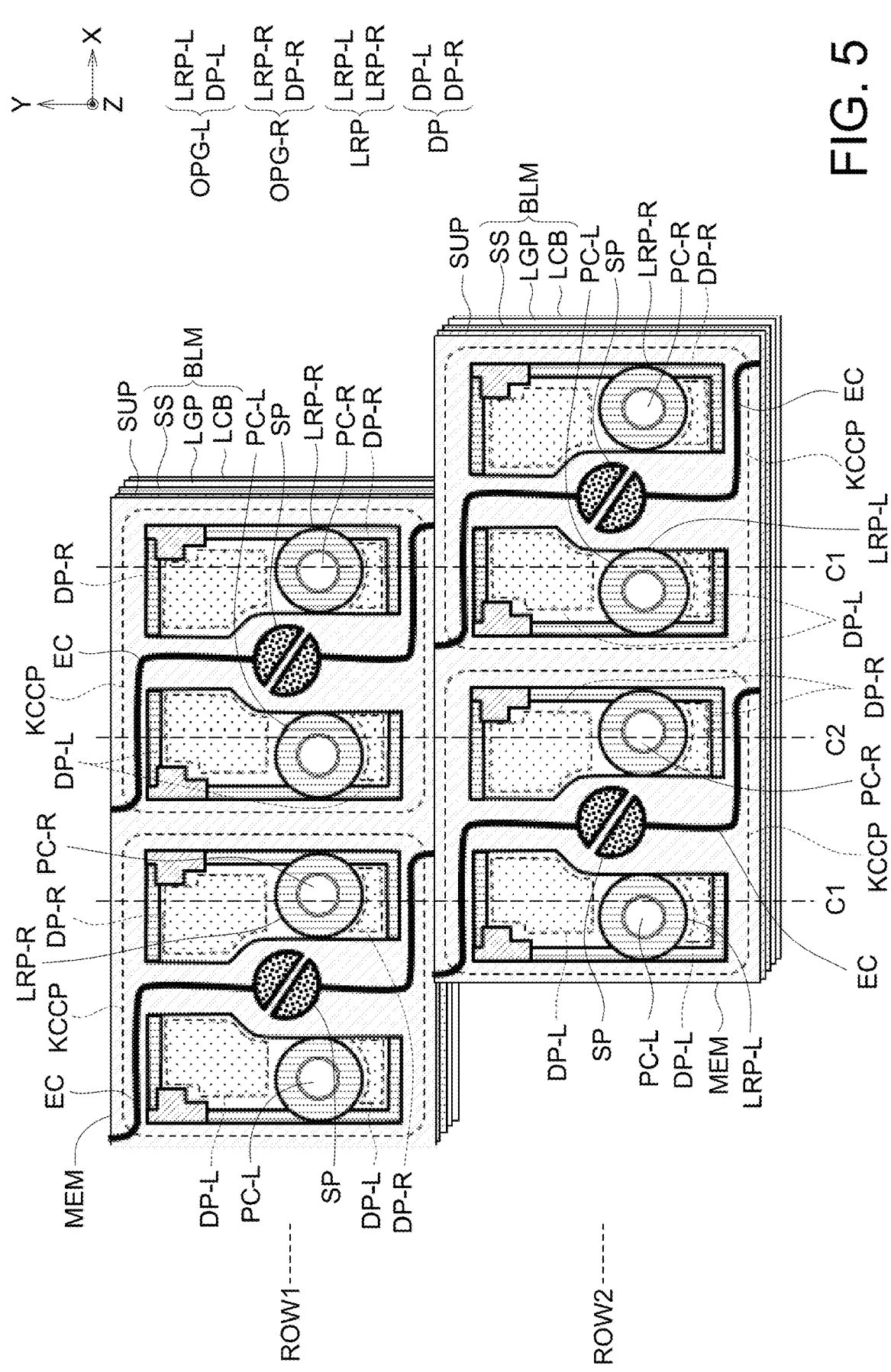
FIG. 5 is a partial top view illustrating the lighting keyboard shown in FIG. 1.

Further referring to FIG. 5, FIG. 5 is a top view illustrating a partial region T2 of the lighting keyboard LKB shown in FIG. 1, wherein the keycap KCC, the support mechanism SSR, the trigger element TE and the restoration member RE are omitted in FIG. 5. The four heat-dissipating keys KS in the partial area T2 can also have all the features described above, which will not repeated herein. The description regarding FIG. 5 mainly focuses on the features of the heat-dissipating keys KS in different rows of the lighting keyboard LKB.

As shown in FIG. 5, the heat-dissipating key KS located on the left side of an top row ROW1 and the heat-dissipating key KS located on the left side of a middle row ROW2 are adjacent in the Y direction but not aligned in the X direction; the heat-dissipating key KS located on the right side of the top row ROW1 and the heat-dissipating key KS located on the right side of the middle row ROW2 are adjacent in the Y direction but is not aligned in the X direction. The right heat-reducing optical pattern group OPG-R (constituted by the right light-reducing pattern LRP-R and the right diffusion pattern DP-R) corresponding to the heat-dissipating key KS located on the left side of the top row ROW1 at least partially overlaps the left heat-reducing optical pattern group OPG-L (constituted by the left light-reducing pattern LRP-L and the left diffusion pattern DP-L) of the heat-dissipating key KS located on the left side of the middle row ROW2 in the Y direction. That is, these two partially overlapping heat-reducing optical pattern groups form an alignment line C1. Furthermore, the right heat-reducing optical pattern group OPG-R (constituted by the right light-reducing pattern LRP-R and the right diffusion pattern DP-R) corresponding to the heat-dissipating key KS located on the right side of the top row ROW1 at least partially overlaps the left heat-reducing optical pattern group OPG-L (constituted by the left light-reducing pattern LRP-L and the left diffusion pattern DP-L) of the heat-dissipating key KS located on the right side of the middle row ROW2 in the Y direction. That is, these two partially overlapping heat-reducing optical pattern groups also form the alignment line C1.

Furthermore, the left heat-reducing optical pattern group OPG-L (constituted by the left light-reducing pattern LRP-L and the left diffusion pattern DP-L) corresponding to the heat-dissipating key KS located on the right side of the top row ROW1 at least partially overlaps the right heat-reducing optical pattern group OPG-R (constituted by the right light-reducing pattern LRP-R and the right diffusion pattern DP-R) of the heat-dissipating key KS located on the left side of the middle row ROW2 in the Y direction. That is, these two partially overlapping heat-reducing optical pattern groups form an alignment line C2. In brief, the alignment line C1 is formed by the right heat-reducing optical pattern group OPG-R of a higher row and the right heat-reducing optical pattern group OPG-R of a lower row, which correspond to two heat-dissipating keys KS being adjacent in the Y direction but not aligned in the X direction; the alignment line C2 is formed by the left heat-reducing optical pattern group OPG-L of a higher row and the right heat-reducing optical pattern group OPG-R of a lower row, which correspond to the two heat-dissipating keys KS that are adjacent in the Y direction but misaligned in the X direction. FIG. 5 shows a special arrangement in which the heat-dissipating keys KS of two adjacent rows in the lighting keyboard LKB are offset by ½ of the key center.

Figure 6:
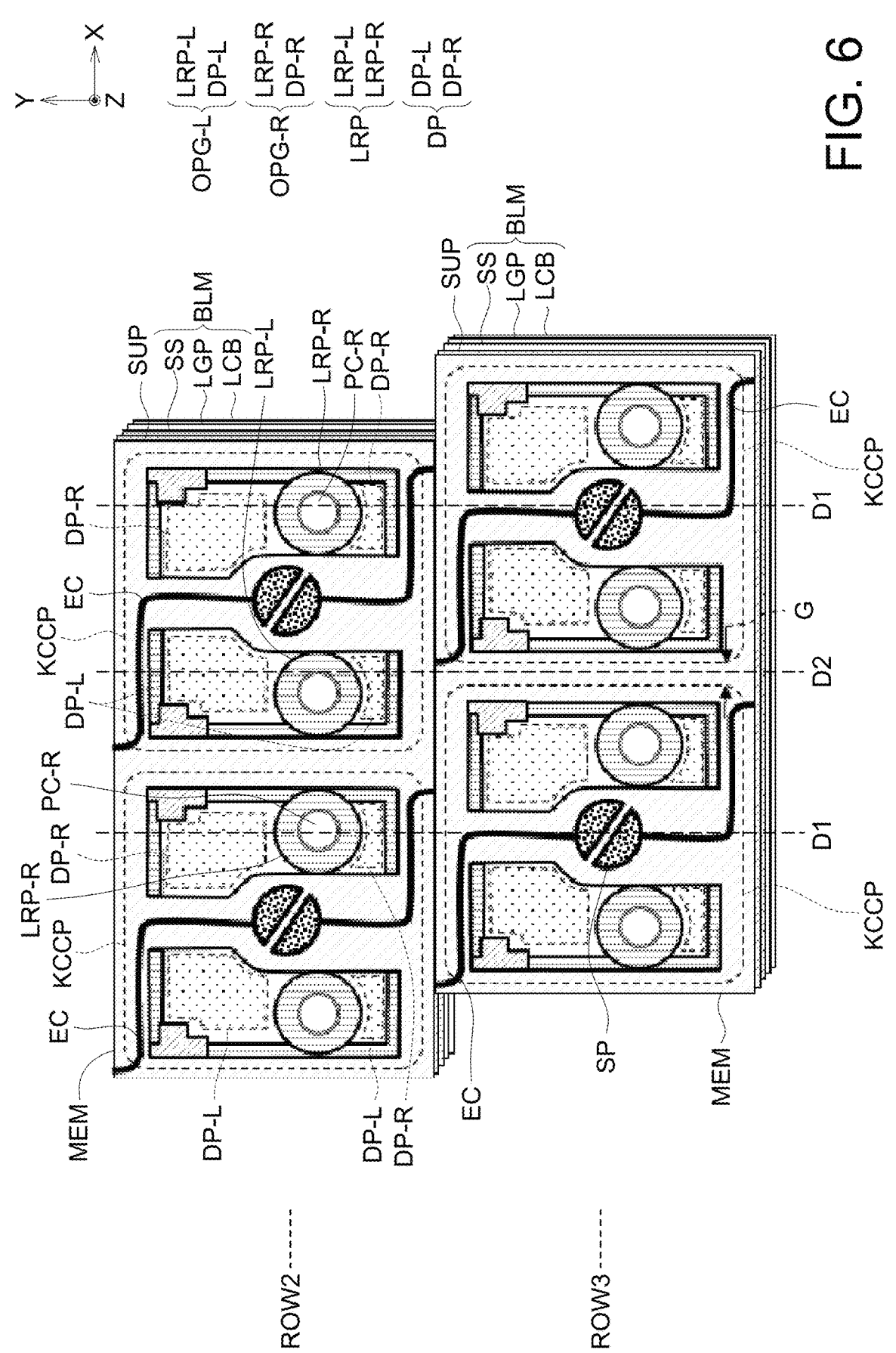
FIG. 6 is a partial top view illustrating the lighting keyboard shown in FIG. 1.

Further referring to FIG. 6, FIG. 6 is a top view illustrating a partial region T3 of the lighting keyboard LKB shown in FIG. 1, wherein the keycap KCC, the support mechanism SSR, the trigger element TE and the restoration member RE are omitted in FIG. 6. The four heat-dissipating keys KS in the partial area T3 can also have all the features described above, which will not repeated herein. The description regarding FIG. 6 mainly focuses on the features of the heat-dissipating keys KS in different rows of the lighting keyboard LKB.

As shown in FIG. 6, the heat-dissipating key KS located on the left side of the middle row ROW2 and the heat-dissipating key KS located on the left side of a bottom row ROW3 are adjacent in the Y direction but not aligned in the X direction; the heat-dissipating key KS located on the right side of the middle row ROW2 and the heat-dissipating key KS located on the right side of the bottom row ROW3 are adjacent in the Y direction but is not aligned in the X direction. The right heat-reducing optical pattern group OPG-R (constituted by the right light-reducing pattern LRP-R and the right diffusion pattern DP-R) corresponding to the heat-dissipating key KS located on the left side of the middle row ROW2 at least partially overlaps the switch pad SP corresponding to the heat-dissipating key KS located on the left side of the bottom row ROW3 in the Y direction. That is, this right heat-reducing optical pattern group and this switch pad SP that partially overlap each other form an alignment line D1. Moreover, the right heat-reducing optical pattern group OPG-R (constituted by the right light-reducing pattern LRP-R and the right diffusion pattern DP-R) corresponding to the heat-dissipating key KS located on the right side of the middle row ROW2 at least partially overlaps the switch pad SP corresponding to the heat-dissipating key KS located on the right side of the bottom row ROW3 in the Y direction. That is, this right heat-reducing optical pattern group and this switch pad SP that partially overlap each other also form the alignment line D1.

Furthermore, the left heat-reducing optical pattern group OPG-L (constituted by the left light-reducing pattern LRP-L and the left diffusion pattern DP-L) corresponding to the heat-dissipating key KS located on the right side of the middle row ROW2 at least partially overlaps a gap region G exterior to the heat-dissipating keys located on the left side or the right side of the bottom row ROW3 in the Y direction. That is, this left heat-reducing optical pattern group and this gap region G that partially overlap each other also form an alignment line D2. In brief, the alignment line D1 is formed by the right heat-reducing optical pattern group OPG-R of a higher row and a switch pad SP of a lower row, which correspond to two heat-dissipating keys KS being adjacent in the Y direction but not aligned in the X direction; the alignment line D2 is formed by the left heat-reducing optical pattern group OPG-L of a higher row and a gap region G of a lower row, which correspond to the two heat-dissipating keys KS that are adjacent in the Y direction but misaligned in the X direction. FIG. 6 shows a special arrangement in which the heat-dissipating keys KS of two adjacent rows in the lighting keyboard LKB are offset by ¼ of the key center.

As mentioned in the above, the present invention makes at least one penetration channel on the lighting keyboard and the backlight module therefor. Accordingly, the through-channel can be configured to dissipate heat in the heat region under the heat-dissipating keys, thereby improving the heat dissipation efficiency of the lighting keyboard. Furthermore, the present invention also makes a light-reducing pattern at periphery of the penetration channel to block light and adjacent diffusion patterns for guiding the light to illuminate the heat-dissipating key, so as to enhance the overall illuminating consistency and to solve the problem of the upward or downward light leakage in the penetration channel.

In another aspect, the lighting keyboard according to embodiments of the present invention may further comprise at least one specific function key to correspond to a specific function of an electronic device to which it is connected or disposed. The specific function may, for example, be an artificial intelligence (AI)-assisted function. When a user presses the specific function key, the AI-assisted function is activated. The backlight module of the lighting keyboard may have a special design and configuration to correspond to the specific function key.

Figure 7A:
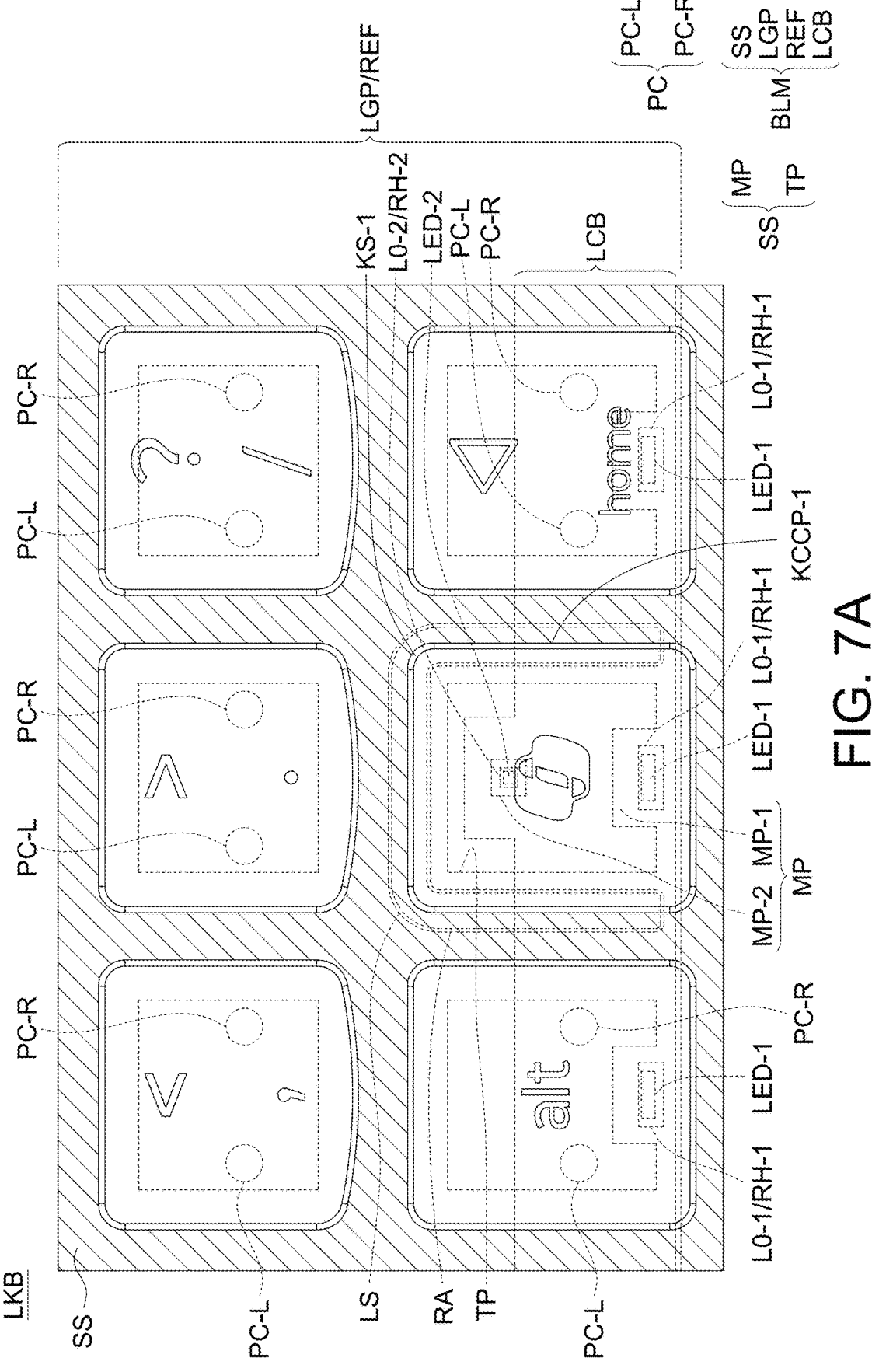
FIG. 7A is a top schematic view illustrating the stacking of a backlight module and a specific function key of the lighting keyboard, according to another embodiment of the present invention.
Figure 7B:
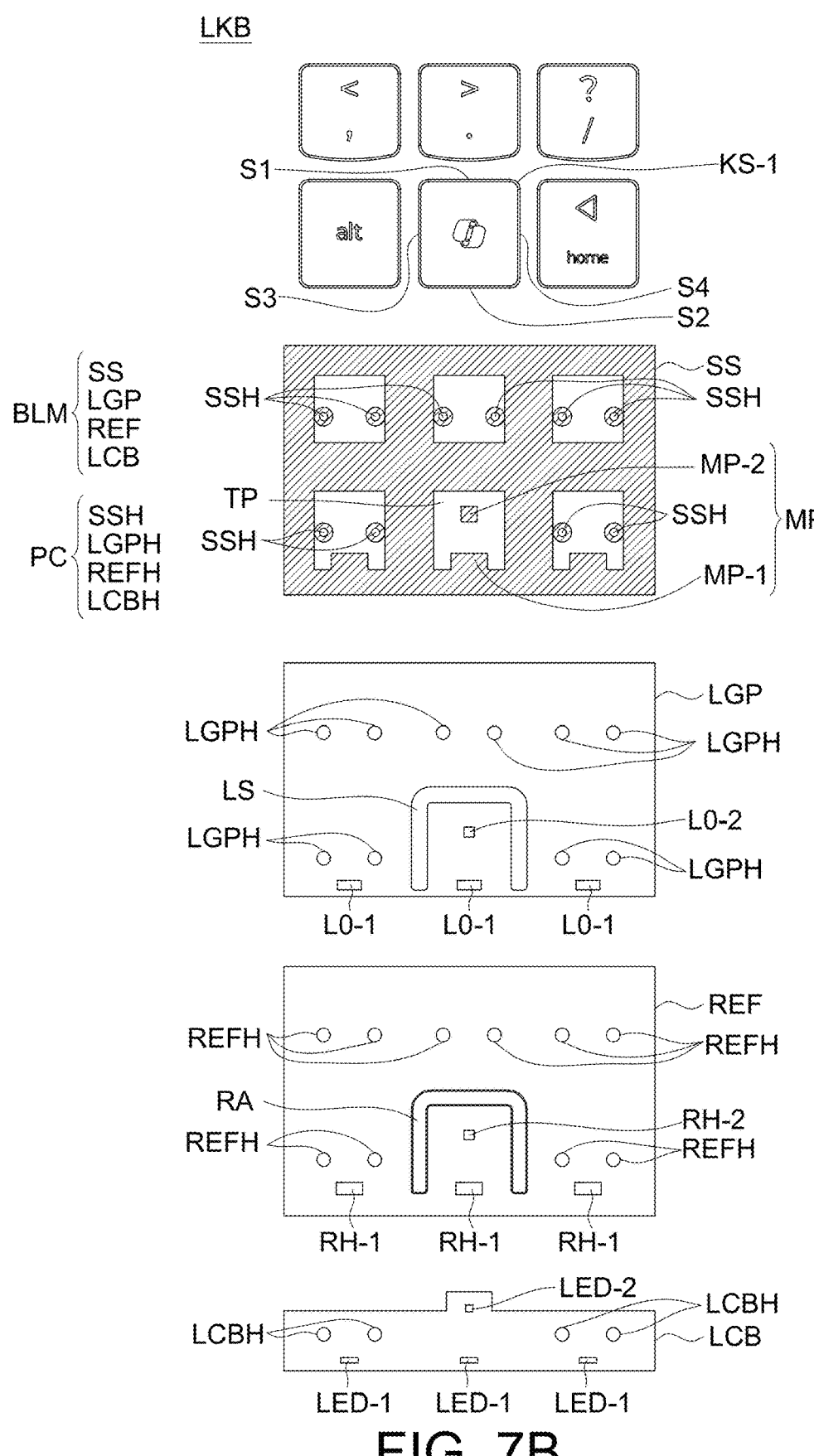
FIG. 7B is an exploded layered view of the backlight module and the specific function key corresponding to the embodiment shown in FIG. 7A.

Referring to FIGS. 7A to 7B, FIG. 7A is a top schematic view of a specific function key KS-1 and a backlight module BLM of an lighting keyboard LKB according to another embodiment of the present invention, and FIG. 7B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP and key circuit board MEM, which may be disposed above the backlight module BLM. However, since this embodiment does not involve any special design or configuration for the support plate SUP and key circuit board MEM, they are omitted in FIGS. 7A to 7B for simplicity of illustration.

As shown in FIGS. 7A to 7B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1 and a second light emitting unit LED-2. The first and second light emitting units LED-1 and LED-2 may be, for example, light emitting diodes. In this embodiment, the first light emitting unit LED-1 is a side-view LED, and the second light emitting unit LED-2 is a top-view LED. The first light emitting unit LED-1 may provide general backlighting for the lighting keyboard LKB, and thus may be provided in plural numbers. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. The first and second light emitting units LED-1 and LED-2 are respectively disposed adjacent to two opposite sides of a keycap projection area KCCP-1 of the specific function key KS-1, wherein the first light emitting unit LED-1 is adjacent to a side S2, and the second light emitting unit LED-2 is adjacent to a side S1.

As shown in FIGS. 7A to 7B, the light guide panel LGP includes a first light guide hole L0-1 and a second light guide hole L0-2. The first light emitting unit LED-1 may be located in the first light guide hole L0-1, and the second light emitting unit LED-2 may be located in the second light guide hole L0-2. The light guide panel LGP may include an adhesive disposed on a top surface and/or a bottom surface thereof, in proximity to the first light guide hole L0-1 and the second light guide hole L0-2. The adhesive surrounds the first light guide hole L0-1 and the second light guide hole L0-2, and is configured to respectively bond the shielding sheet SS and/or the lighting board LCB. Since the first and second light guide holes L0-1 and L0-2 are aligned respectively with the first and second light emitting units LED-1 and LED-2, the first and second light guide holes L0-1 and L0-2 are also respectively disposed adjacent to two opposite sides of the keycap projection area KCCP-1 of the specific function key KS-1. That is, the first light guide hole L0-1 is adjacent to the side S2, and the second light guide hole L0-2 is adjacent to the side S1. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, wherein the side S3 and the side S4 are adjacent sides connected to the side S1 and the side S2.

As shown in FIGS. 7A to 7B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1 and an inner block portion MP-2. The outer frame portion MP-1 surrounds the light transmitting portion TP, and the inner block portion MP-2 is located within located within a range of the light transmitting portion TP. The masking portion MP overlaps in projection with the first and second light emitting units LED-1 and LED-2. Specifically, in the stacking (vertical) direction, the first light emitting unit LED-1 overlaps in projection with the outer frame portion MP-1, and the second light emitting unit LED-2 overlaps in projection with the inner block portion MP-2. The masking portion MP functions as a means for adjusting the light output from the first and second light emitting units LED-1 and LED-2 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1, but does not overlap in projection with the inner block portion MP-2. The light guide panel slot LS surrounds the light transmitting portion TP, and does not overlap in projection with the light transmitting portion TP.

Furthermore, as shown in FIGS. 7A to 7B, the backlight module BLM may further include a reflective layer REF. The reflective layer REF may be disposed between the light guide panel LGP and the lighting board LCB. The reflective layer REF may include a first reflective layer hole RH-1 and a second reflective layer hole RH-2 corresponding to the first and second light emitting units LED-1 and LED-2. The first light emitting unit LED-1 may be disposed in the first reflective layer hole RH-1, and the second light emitting unit LED-2 may be disposed in the second reflective layer hole RH-2. The first light guide hole L0-1 and the first reflective layer hole RH-1 are vertically aligned, and the second light guide hole L0-2 and the second reflective layer hole RH-2 are vertically aligned. Thus, the first light emitting unit LED-1 may pass through both the first light guide hole L0-1 and the first reflective layer hole RH-1, and the second light emitting unit LED-2 may pass through both the second light guide hole L0-2 and the second reflective layer hole RH-2. The reflective layer REF may further include an attachment portion RA. The attachment portion RA corresponds in shape to the light guide panel slot LS and is also in an inverted U-shape. The light guide panel slot LS and the attachment portion RA are vertically aligned. The attachment portion RA overlaps in projection with the masking portion MP of the shielding sheet SS and with the boundary of the keycap projection area KCCP-1. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS, but it is not limited thereto. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink.

Figure 8A:
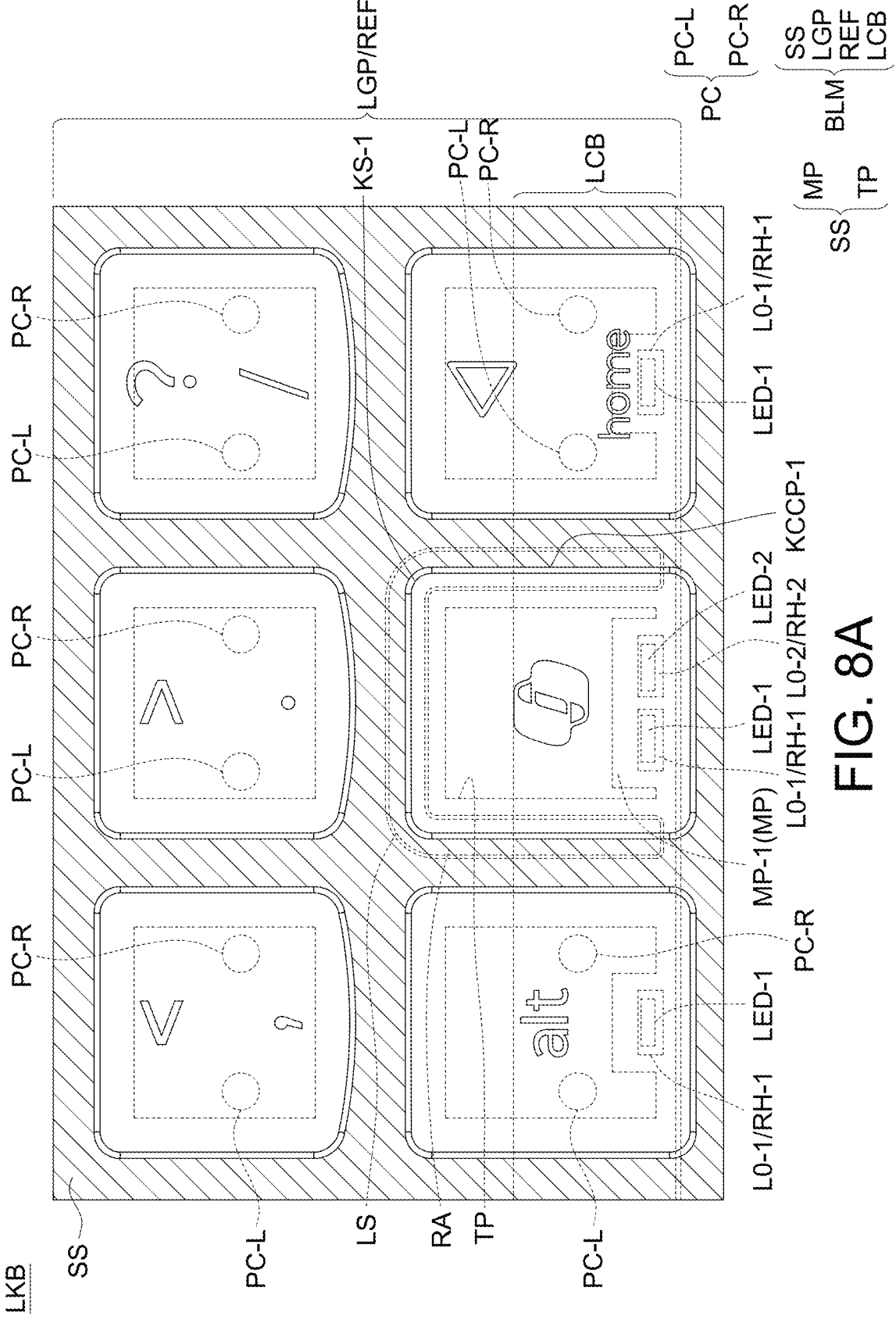
FIG. 8A is a top schematic view illustrating the stacking of a backlight module and a specific function key of the lighting keyboard, according to another embodiment of the present invention.
Figure 8B:
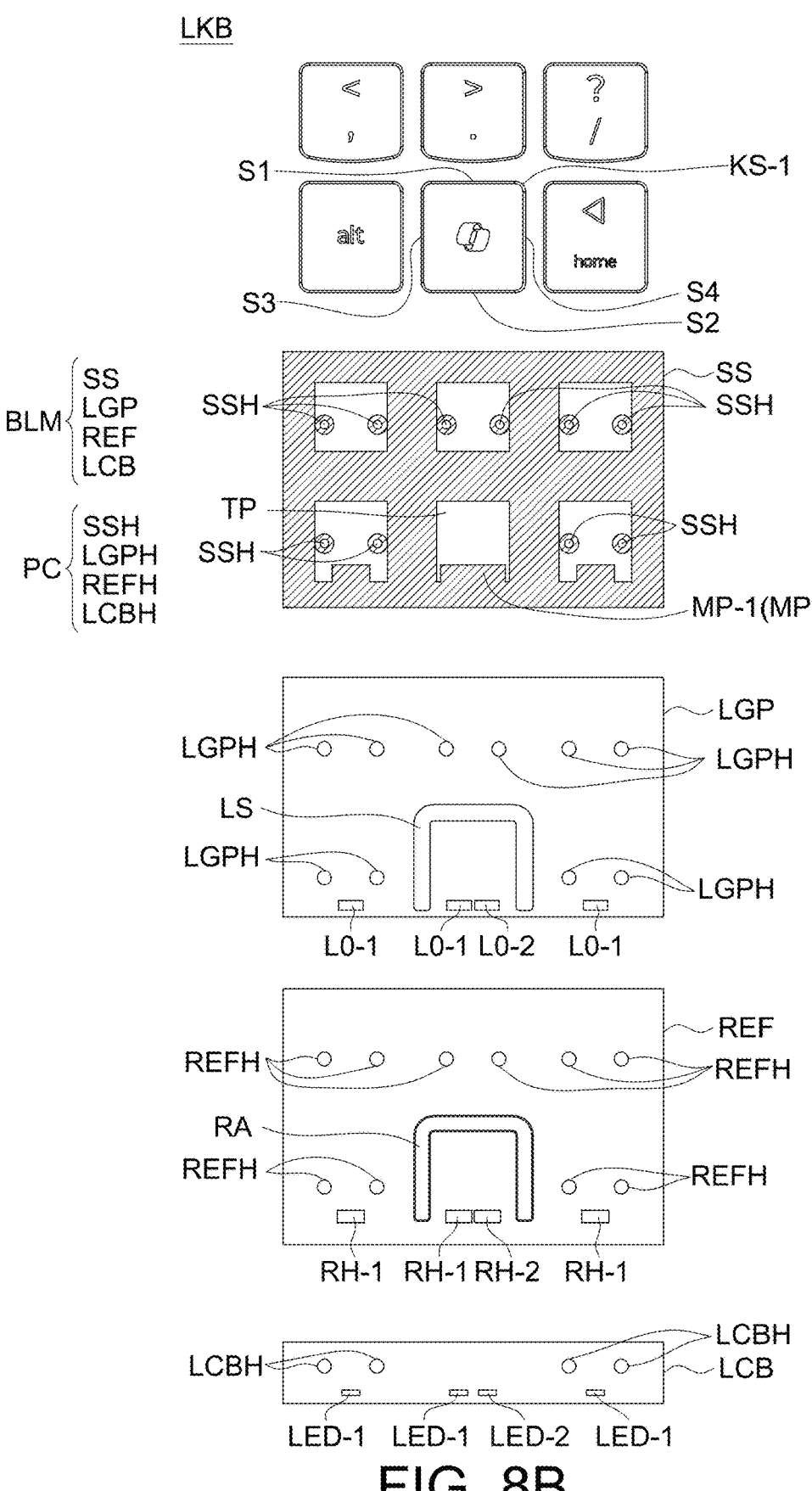
FIG. 8B is an exploded layered view of the backlight module and the specific function key corresponding to the embodiment shown in FIG. 8A.

Referring to FIGS. 8A to 8B, FIG. 8A is a top schematic view of a specific function key KS-1 and a backlight module BLM of an lighting keyboard LKB according to another embodiment of the present invention, and FIG. 8B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP and key circuit board MEM, which may be disposed above the backlight module BLM. However, since this embodiment does not involve any special design or configuration for the support plate SUP and key circuit board MEM, they are omitted in FIGS. 8A to 8B for simplicity of illustration.

As shown in FIGS. 8A to 8B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1 and a second light emitting unit LED-2. The first and second light emitting units LED-1 and LED-2 may be, for example, light emitting diode. In this embodiment, both the first light emitting unit LED-1 and the second light emitting unit LED-2 are side-view LEDs, to emit light toward a side S1 of a keycap projection area KCCP-1 of a specific function key KS-1. The first light emitting unit LED-1 may provide general backlighting for the lighting keyboard LKB, and thus may be provided in plural numbers. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. Further, in this embodiment, a light color of the first light emitting unit LED-1 and a light color of the second light emitting unit LED-2 may be configured to be different, such that the dedicated backlighting of the specific function key KS-1 is distinguishable from the general backlighting of other keys. The first and second light emitting units LED-1 and LED-2 are disposed both adjacent to a side S2 of a keycap projection area KCCP-1 of the specific function key KS-1. The first light emitting unit LED-1 and the second light emitting unit LED-2 are arranged side by side and configured to emit light in the same direction, namely toward the side S1.

As shown in FIGS. 8A to 8B, the light guide panel LGP includes a first light guide hole L0-1 and a second light guide hole L0-2. The first light emitting unit LED-1 may be located in the first light guide hole L0-1, and the second light emitting unit LED-2 may be located in the second light guide hole L0-2. The light guide panel LGP may include an adhesive disposed on a top surface and/or a bottom surface thereof, in proximity to the first light guide hole L0-1 and the second light guide hole L0-2. The adhesive surrounds the first light guide hole L0-1 and the second light guide hole L0-2, and is configured to respectively bond the shielding sheet SS and/or the lighting board LCB. Since the first and second light guide holes L0-1 and L0-2 are aligned respectively with the first and second light emitting units LED-1 and LED-2, the first and second light guide holes L0-1 and L0-2 are disposed adjacent to the side S2 of the keycap projection area KCCP-1 of the specific function key KS-1, and are arranged side by side. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, and the light guide panel slot LS does not overlap in projection with the side S2 where the first light emitting unit LED-1 and the second light emitting unit LED-2 are adjacent, wherein the side S3 and the side S4 are adjacent sides connected to the side S1 and the side S2.

As shown in FIGS. 8A to 8B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1. The outer frame portion MP-1 surrounds the light transmitting portion TP. The masking portion MP overlaps in projection with the first and second light emitting units LED-1 and LED-2. Specifically, in the stacking (vertical) direction, the outer frame portion MP-1 overlaps in projection with the first light emitting unit LED-1 and the second light emitting unit LED-2. The masking portion MP functions as a means for adjusting the light output from the first and second light emitting units LED-1 and LED-2 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1. The light guide panel slot LS surrounds the light transmitting portion TP, and does not overlap in projection with the light transmitting portion TP.

Furthermore, as shown in FIGS. 8A to 8B, the backlight module BLM may further include a reflective layer REF. The reflective layer REF may be disposed between the light guide panel LGP and the lighting board LCB. The reflective layer REF may include a first reflective layer hole RH-1 and a second reflective layer hole RH-2 corresponding to the first and second light emitting units LED-1 and LED-2. The first light emitting unit LED-1 may be disposed in the first reflective layer hole RH-1, and the second light emitting unit LED-2 may be disposed in the second reflective layer hole RH-2. The first light guide hole L0-1 and the first reflective layer hole RH-1 are vertically aligned, and the second light guide hole L0-2 and the second reflective layer hole RH-2 are vertically aligned. Thus, the first light emitting unit LED-1 may pass through both the first light guide hole L0-1 and the first reflective layer hole RH-1, and the second light emitting unit LED-2 may pass through both the second light guide hole L0-2 and the second reflective layer hole RH-2. The reflective layer REF may further include an attachment portion RA. The attachment portion RA corresponds in shape to the light guide panel slot LS and is also in an inverted U-shape. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink, but it is not limited thereto.

Figure 9A:
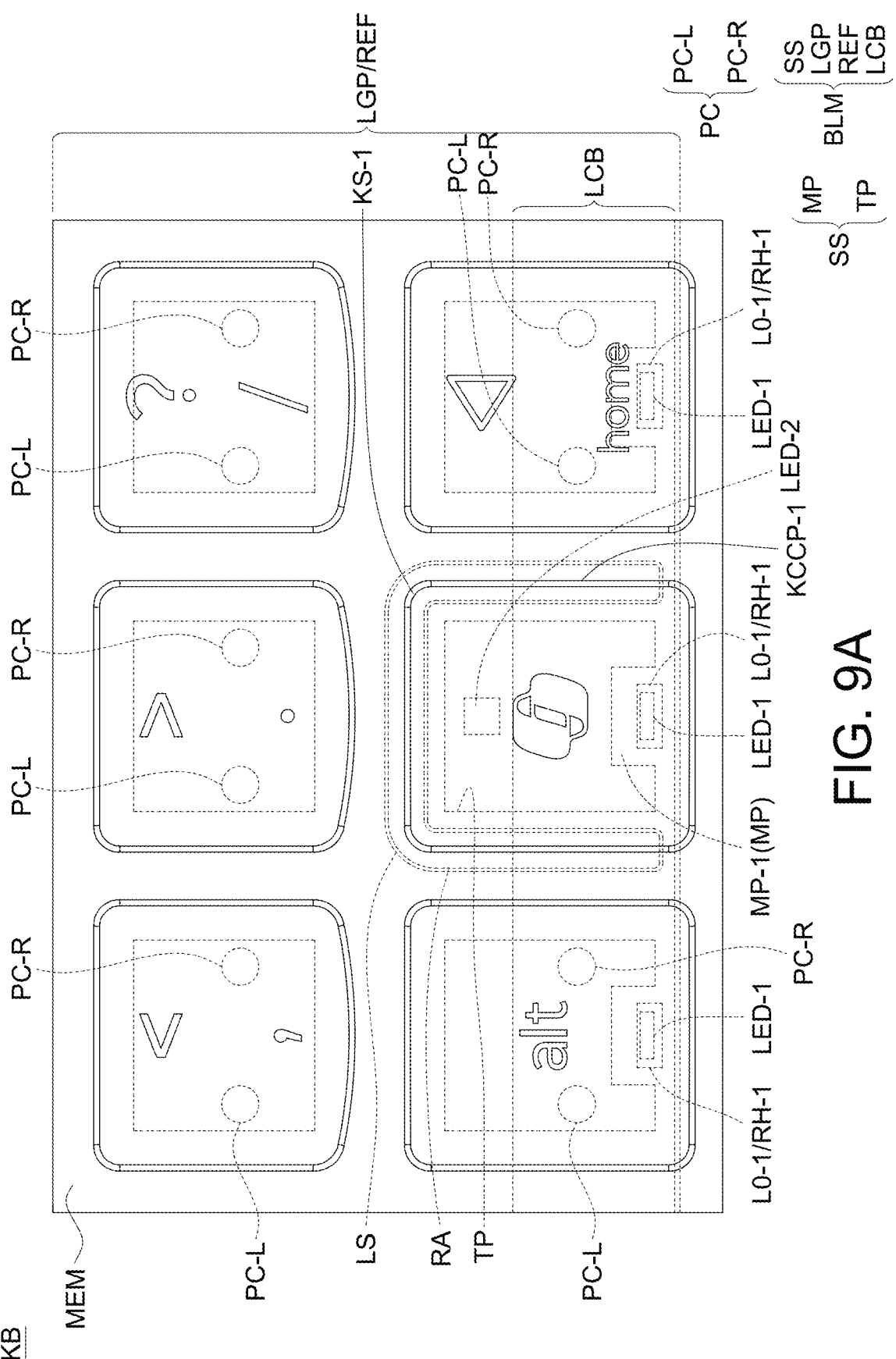
FIG. 9A is a top schematic view illustrating the stacking of a backlight module and a specific function key of the lighting keyboard, according to another embodiment of the present invention.
Figure 9B:
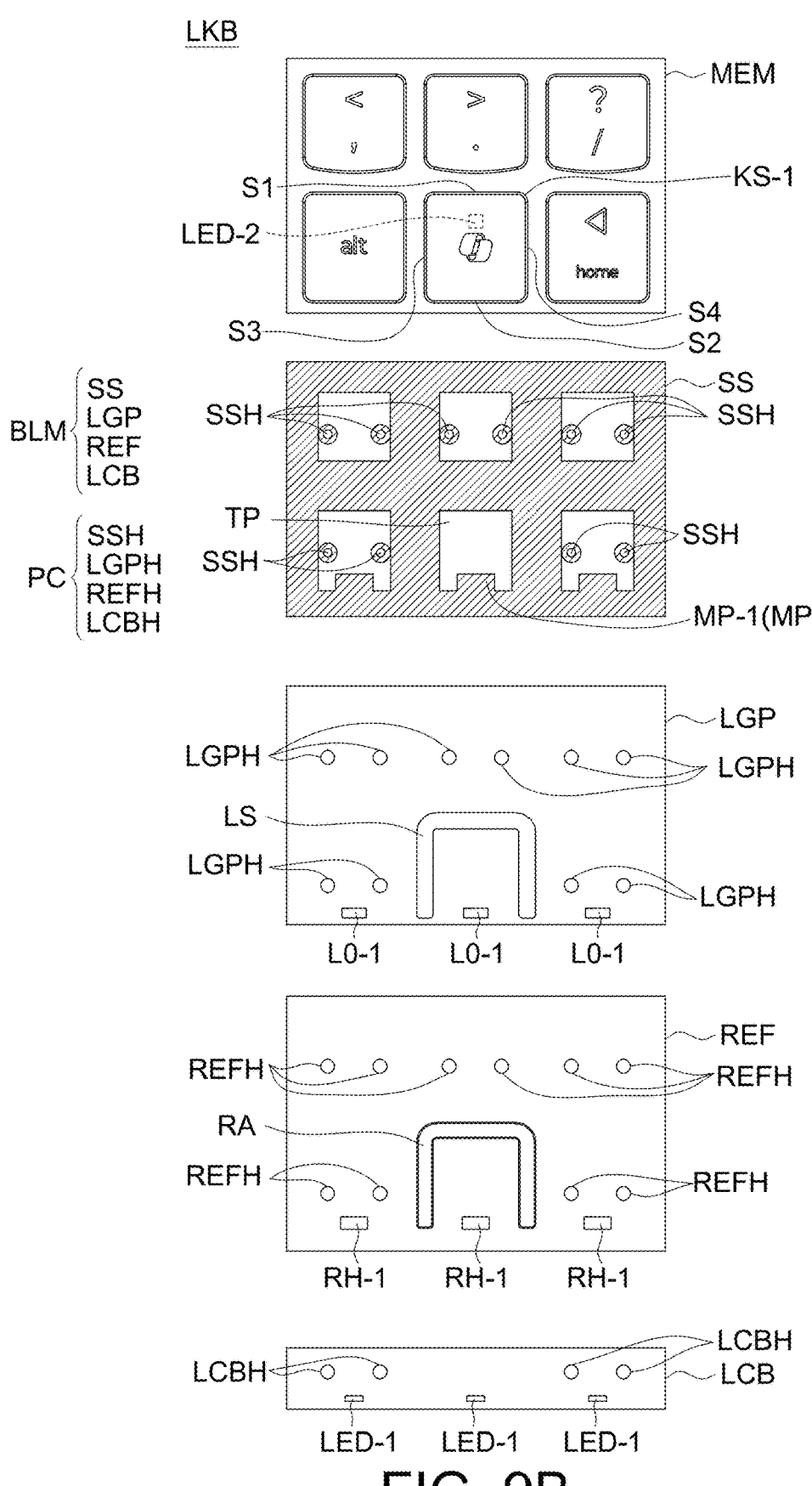
FIG. 9B is an exploded layered view of the backlight module and the specific function key corresponding to the embodiment shown in FIG. 9A.

Referring to FIGS. 9A to 9B, FIG. 9A is a top schematic view of a specific function key KS-1 and a backlight module BLM of an lighting keyboard LKB according to another embodiment of the present invention, and FIG. 9B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP, which may be disposed above the backlight module BLM and below the key circuit board MEM. However, since this embodiment does not involve any special design or configuration for the support plate SUP, it is omitted in FIGS. 9A to 9B for simplicity of illustration.

As shown in FIGS. 9A to 9B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1. The first light emitting unit LED-1 may be, for example, a light emitting diode. In this embodiment, the first light emitting unit LED-1 is a side-view LED, to emit light toward a side S1 of a keycap projection area KCCP-1 of a specific function key KS-1. The first light emitting unit LED-1 may provide general backlighting for the lighting keyboard LKB, and thus may be provided in plural numbers. The specific function key KS-1 may include a key circuit board MEM. The difference from the embodiments illustrated in FIGS. 7A to 7B and 8A to 8B lies in that, in this embodiment, the key circuit board MEM may include the second light emitting unit LED-2 i.e., the second light emitting unit LED-2 is not disposed on the lighting board LCB. The second light emitting unit LED-2 may be disposed on the top surface of the key circuit board MEM, thereby being located on a different layer of the lighting keyboard LKB from the first light emitting unit LED-1. The second light emitting unit LED-2 is, for example, a light emitting diode. In this embodiment, the second light emitting unit LED-2 is a top-view LED. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. The first and second light emitting units LED-1 and LED-2 are respectively disposed adjacent to two opposite sides of a keycap projection area KCCP-1 of the specific function key KS-1, wherein the first light emitting unit LED-1 is adjacent to a side S2, and the second light emitting unit LED-2 is adjacent to a side S1.

As shown in FIGS. 9A to 9B, the light guide panel LGP includes a first light guide hole L0-1. The first light emitting unit LED-1 may be located in the first light guide hole L0-1. The light guide panel LGP may include an adhesive disposed on a top surface and/or a bottom surface thereof, in proximity to the first light guide hole L0-1. The adhesive surrounds the first light guide hole L0-1, and is configured to bond the shielding sheet SS and/or the lighting board LCB. Since the first light guide hole L0-1 is aligned with the first light emitting unit LED-1, the first light guide hole L0-1 is disposed adjacent to a side S2 of the keycap projection area KCCP-1 of the specific function key KS-1. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, and the light guide panel slot LS does not overlap in projection with the side S2 where the first light emitting unit LED-1 is adjacent, wherein the side S3 and the side S4 are adjacent sides connected to the side S1 and the side S2.

As shown in FIGS. 9A to 9B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1. The outer frame portion MP-1 surrounds the light transmitting portion TP. The masking portion MP overlaps in projection with the first light emitting unit LED-1. Specifically, in the stacking (vertical) direction, the first light emitting unit LED-1 overlaps in projection with the outer frame portion MP-1. The masking portion MP functions as a means for adjusting the light output from the first light emitting unit LED-1 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1. The light guide panel slot LS surrounds the light transmitting portion TP, and does not overlap in projection with the light transmitting portion TP. The second light emitting unit LED-2 overlaps in projection with the light transmitting portion TP. That is, in a top view along the stacking (vertical) direction, the second light emitting unit LED-2 is located within a range of the light transmitting portion TP.

Furthermore, as shown in FIGS. 9A to 9B, the backlight module BLM may further include a reflective layer REF. The reflective layer REF may be disposed between the light guide panel LGP and the lighting board LCB. The reflective layer REF may include a first reflective layer hole RH-1 corresponding to the first light emitting unit LED-1. The first light emitting unit LED-1 may be disposed in the first reflective layer hole RH-1. The first light guide hole L0-1 and the first reflective layer hole RH-1 are vertically aligned. Thus, the first light emitting unit LED-1 may pass through both the first light guide hole L0-1 and the first reflective layer hole RH-1. The reflective layer REF may further include an attachment portion RA. The attachment portion RA corresponds in shape to the light guide panel slot LS and is also in an inverted U-shape. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink, but it is not limited thereto.

Figure 10A:
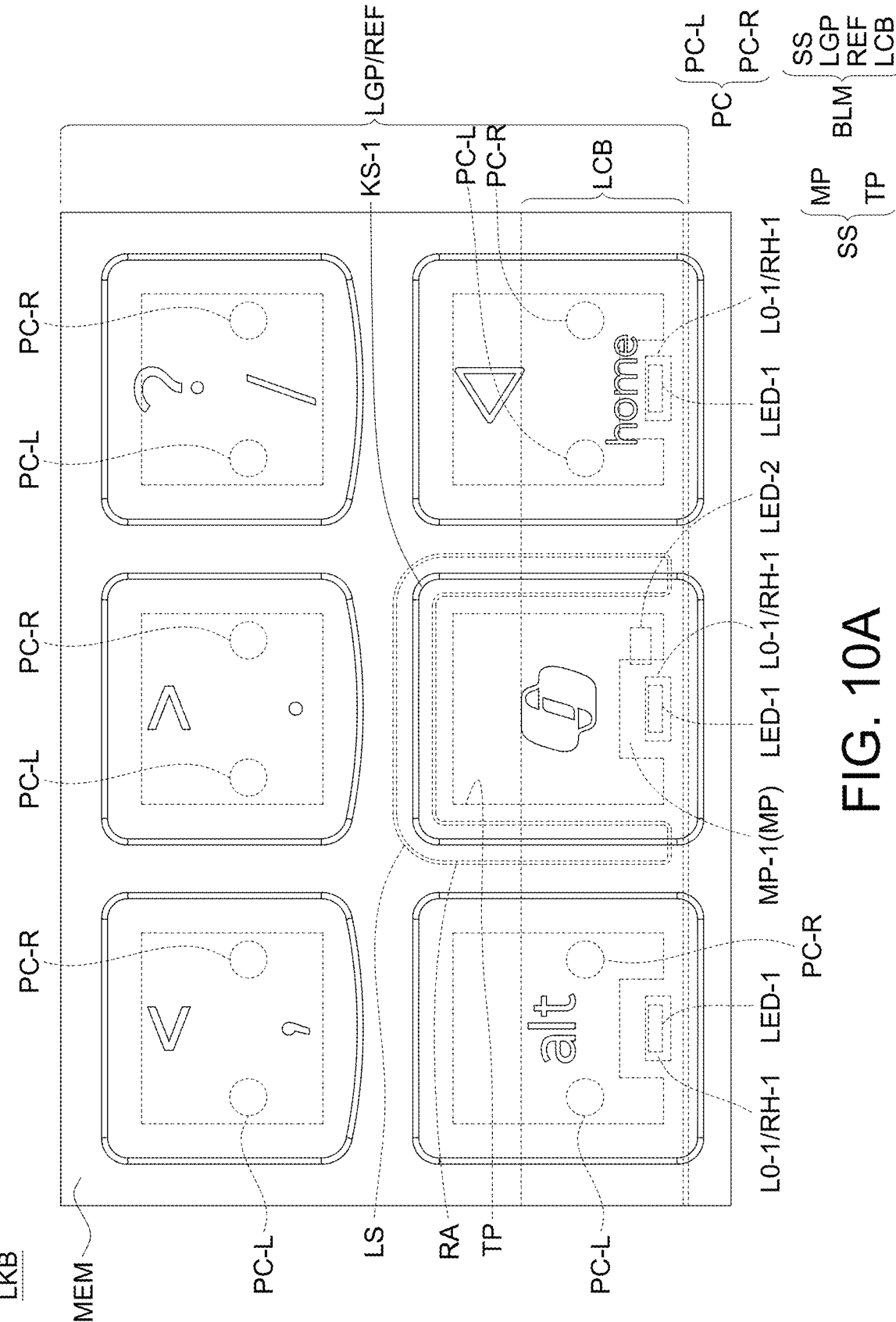
FIG. 10A is a top schematic view illustrating the stacking of a backlight module and a specific function key of the lighting keyboard, according to another embodiment of the present invention.
Figure 10B:
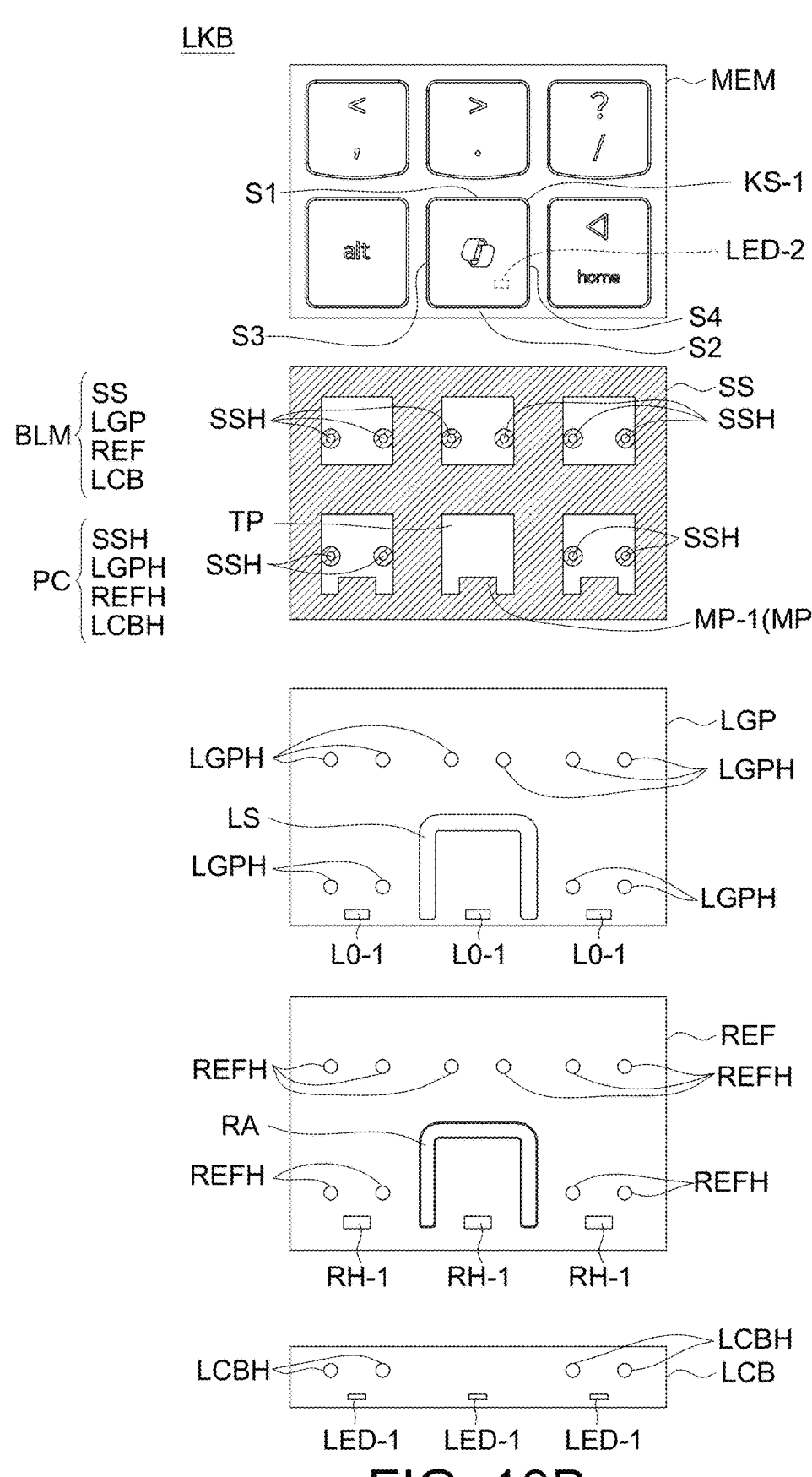
FIG. 10B is an exploded layered view of the backlight module and the specific function key corresponding to the embodiment shown in FIG. 10A.

Referring to FIGS. 10A to 10B, FIG. 10A is a top schematic view of a specific function key KS-1 and a backlight module BLM of an lighting keyboard LKB according to another embodiment of the present invention, and FIG. 10B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP, which may be disposed above the backlight module BLM and below the key circuit board MEM. However, since this embodiment does not involve any special design or configuration for the support plate SUP, it is omitted in FIGS. 10A to 10B for simplicity of illustration.

As shown in FIGS. 10A to 10B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1. The first light emitting unit LED-1 may be, for example, a light emitting diode. In this embodiment, the first light emitting unit LED-1 is a side-view LED, to emit light toward a side S1 of a keycap projection area KCCP-1 of a specific function key KS-1. The first light emitting unit LED-1 may provide general backlighting for the lighting keyboard LKB, and thus may be provided in plural numbers. The specific function key KS-1 may include a key circuit board MEM. The difference from the embodiments illustrated in FIGS. 7A to 7B and 8A to 8B lies in that, in this embodiment, the key circuit board MEM may include the second light emitting unit LED-2 i.e., the second light emitting unit LED-2 is not disposed on the lighting board LCB. The second light emitting unit LED-2 may be disposed on the top surface of the key circuit board MEM, thereby being located on a different layer of the lighting keyboard LKB from the first light emitting unit LED-1. The second light emitting unit LED-2 is, for example, a light emitting diode. In this embodiment, the second light emitting unit LED-2 is a side-view LED. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. Further, in this embodiment, a light color of the first light emitting unit LED-1 and a light color of the second light emitting unit LED-2 may be configured to be different, such that the dedicated backlighting of the specific function key KS-1 is distinguishable from the general backlighting of other keys. The first and second light emitting units LED-1 and LED-2 are disposed both adjacent to a side S2 of a keycap projection area KCCP-1 of the specific function key KS-1. The first light emitting unit LED-1 and the second light emitting unit LED-2 are arranged side by side and configured to emit light in the same direction, namely toward the side S1.

As shown in FIGS. 10A to 10B, the light guide panel LGP includes a first light guide hole L0-1. The first light emitting unit LED-1 may be located in the first light guide hole L0-1. The light guide panel LGP may include an adhesive disposed on a top surface and/or a bottom surface thereof, in proximity to the first light guide hole L0-1. The adhesive surrounds the first light guide hole L0-1, and is configured to bond the shielding sheet SS and/or the lighting board LCB. Since the first light guide hole L0-1 is aligned with the first light emitting unit LED-1, the first light guide hole L0-1 is disposed adjacent to the same side S2 of the keycap projection area KCCP-1 of the specific function key KS-1. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, and the light guide panel slot LS does not overlap in projection with the side S2 where the first light emitting unit LED-1 and the second light emitting unit LED-2 are adjacent, wherein the side S3 and the side S4 are adjacent sides connected to the side S1 and the side S2.

As shown in FIGS. 10A to 10B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1. The outer frame portion MP-1 surrounds the light transmitting portion TP. The masking portion MP overlaps in projection with the first light emitting unit LED-1. Specifically, in the stacking (vertical) direction, the first light emitting unit LED-1 overlaps in projection with the outer frame portion MP-1. The masking portion MP functions as a means for adjusting the light output from the first light emitting unit LED-1 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1. The light guide panel slot LS surrounds the light transmitting portion TP, and does not overlap in projection with the light transmitting portion TP. The second light emitting unit LED-2 overlaps in projection with the light transmitting portion TP. That is, in a top view along the stacking (vertical) direction, the second light emitting unit LED-2 is located within a range of the light transmitting portion TP. Also, in a top view along the stacking (vertical) direction, the second light emitting unit LED-2 partially overlaps in projection with the masking portion MP.

Furthermore, as shown in FIGS. 10A to 10B, the backlight module BLM may further include a reflective layer REF. The reflective layer REF may be disposed between the light guide panel LGP and the lighting board LCB. The reflective layer REF may include a first reflective layer hole RH-1 corresponding to the first light emitting unit LED-1. The first light emitting unit LED-1 may be disposed in the first reflective layer hole RH-1. The first light guide hole L0-1 and the first reflective layer hole RH-1 are vertically aligned. Thus, the first light emitting unit LED-1 may pass through both the first light guide hole L0-1 and the first reflective layer hole RH-1. The reflective layer REF may further include an attachment portion RA. The attachment portion RA corresponds in shape to the light guide panel slot LS and is also in an inverted U-shape. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink, but it is not limited thereto.

The layout of each embodiment related to the specific function key KS-1 within the light emitting keyboard LKB is described below. As shown in FIGS. 7B, 8B, 9B, and 10B, the specific function key KS-1 and its two adjacent keys can be aligned with three keys located in an adjacent row. The three keys located in the adjacent row relative to the specific function key KS-1 may adopt the design of the heat-dissipating key KS as described previously. Furthermore, the three keys in the adjacent row relative to the specific function key KS-1 may, for example, correspond to the heat-dissipating keys KS located in the middle row ROW2 of the special layout illustrated in FIG. 5. In other words, since the specific function key KS-1 is aligned with the three keys located in the adjacent row, and since these three keys may be heat-dissipating keys KS positioned in the middle row ROW2, it can be understood that the specific function key KS-1 may be offset from the heat-dissipating key KS located in the top row ROW1 (as shown in FIG. 5) by ½ of the key center. Accordingly, in the embodiments shown in FIGS. 7A-7B and 9A-9B, the first light emitting unit LED-1 and the second light emitting unit LED-2 may be disposed between the left penetration channel PC-L and the right penetration channel PC-R of a heat-dissipating key KS located in the middle row ROW2. Additionally, in the embodiments shown in FIGS. 7A-7B and 9A-9B, the first light emitting unit LED-1 and the second light emitting unit LED-2 may be disposed between the right penetration channel PC-R of a heat-dissipating key KS located in the top row ROW1 and the left penetration channel PC-L of another adjacent heat-dissipating key KS also located in the top row ROW1. Furthermore, in the embodiments shown in FIGS. 8A-8B and 10A-10B, the first light emitting unit LED-1 and the second light emitting unit LED-2 may be disposed such that, in the X direction (as shown in FIG. 5), they at least partially overlap the region between the left penetration channel PC-L and the right penetration channel PC-R of a heat-dissipating key KS located in the middle row ROW2. Additionally, in the embodiments shown in FIGS. 8A-8B and 10A-10B, the first light emitting unit LED-1 and the second light emitting unit LED-2 may be disposed such that, in the X direction (as shown in FIG. 5), they respectively at least partially overlap the right penetration channel PC-R of a heat-dissipating key KS located in the top row ROW1 and the left penetration channel PC-L of another adjacent heat-dissipating key KS also located in the top row ROW1.

Figure 11A:
FIGS. 11A to 11C are schematic diagrams illustrating embodiments of the specific function key in response to the operation mechanism of a computing device.
Figure 11B:
Figure 11C:
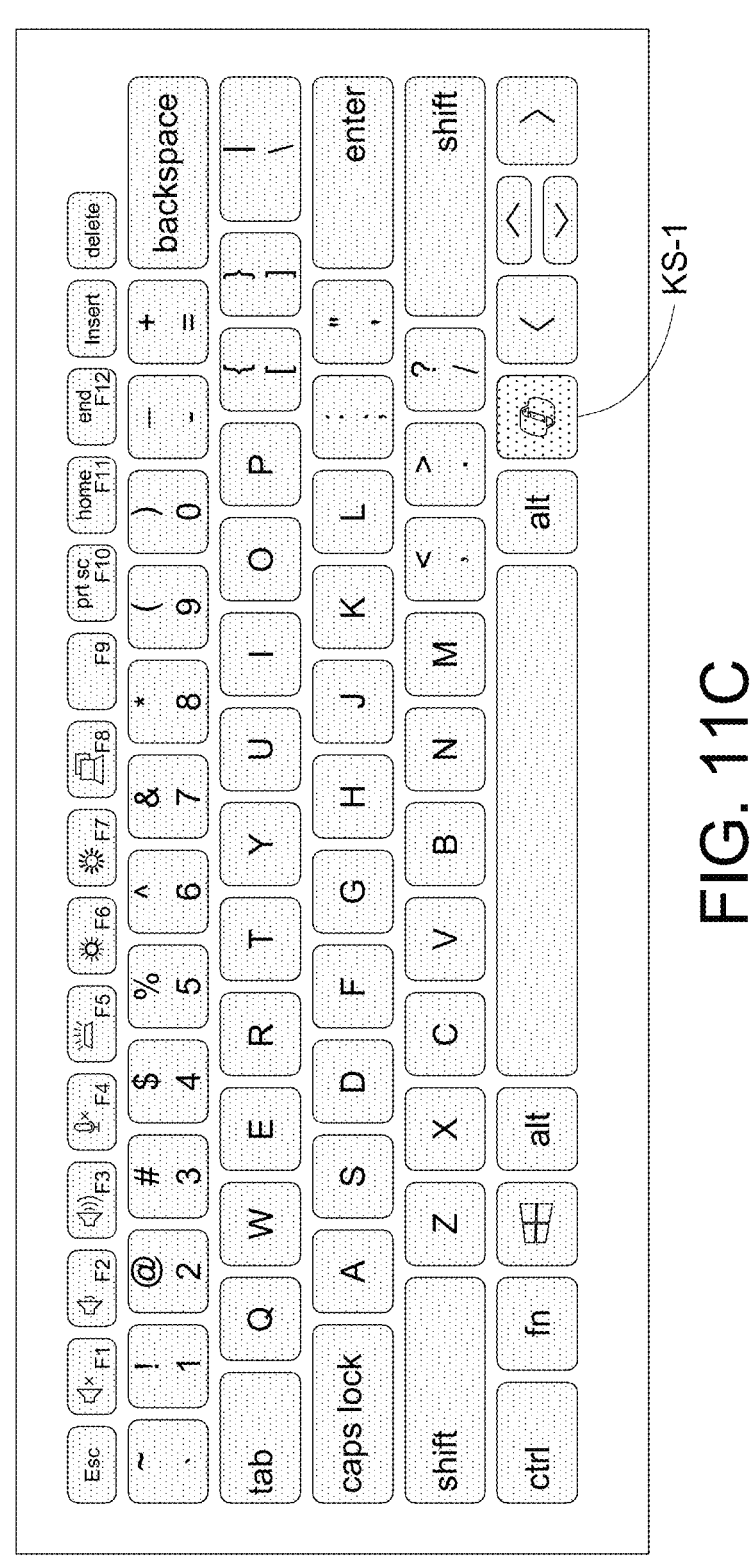

Then, the operation mechanism of the above-described embodiments of the specific function key KS-1 in response to the operation of a computing device will be explained. Referring to FIGS. 11A to 11C. FIG. 11A is a schematic diagram illustrating a first state of the lighting keyboard LKB in response to the operation mechanism of the computing device. FIG. 11B is a schematic diagram illustrating a second state of the lighting keyboard LKB in response to the operation mechanism of the computing device. FIG. 11C is a schematic diagram illustrating a third state of the lighting keyboard LKB in response to the operation mechanism of the computing device.

As shown in FIG. 11A, in the first state, when the specific function (e.g., AI-assisted function) of the computing device is not activated, a computing unit of the computing device can control the first light emitting unit LED-1 in the lighting keyboard LKB to emit light and control the second light emitting unit LED-2 below the specific function key KS-1 not to emit light. In the figures, halftone dots indicate illumination. At this time, in the first state, the lighting keyboard LKB provides a function of general backlighting. The computing unit of the computing device in the first state operates at a first performance level, a memory of the computing device operates at a first usage level, and a fan of the computing device operates at a first rotational speed or may not operate.

As shown in FIG. 11B, in the second state, when the specific function such as the AI-assisted function of the computing device is activated (i.e., the specific function key KS-1 is pressed), the computing unit of the computing device can control the second light emitting unit LED-2 under the specific function key KS-1 to emit light and control the first light emitting unit LED-1 in the lighting keyboard LKB not to emit light. In the figures, halftone dots indicate illumination. At this time, in the second state, the lighting keyboard LKB provides a function of dedicated backlighting for the specific function key KS-1. The computing unit of the computing device operates at a second performance level higher than the first performance level, the memory of the computing device operates at a second usage level higher than the first usage level, and the fan of the computing device operates at a second rotational speed higher than the first rotational speed.

As shown in FIG. 11C, in the third state, likewise when the specific function such as the AI-assisted function of the computing device is activated (i.e., the specific function key KS-1 is pressed), the computing unit of the computing device can control both the second light emitting unit LED-2 under the specific function key KS-1 and the first light emitting unit LED-1 in the lighting keyboard LKB to emit light. In the figures, halftone dots indicate illumination. At this time, in the third state, the lighting keyboard LKB provides both the function of general backlighting and the function of dedicated backlighting for the specific function key KS-1. The computing unit of the computing device operates at a third performance level higher than the second performance level, the memory of the computing device operates at a third usage level higher than the second usage level, and the fan of the computing device operates at a third rotational speed higher than the second rotational speed.

Figure 12:
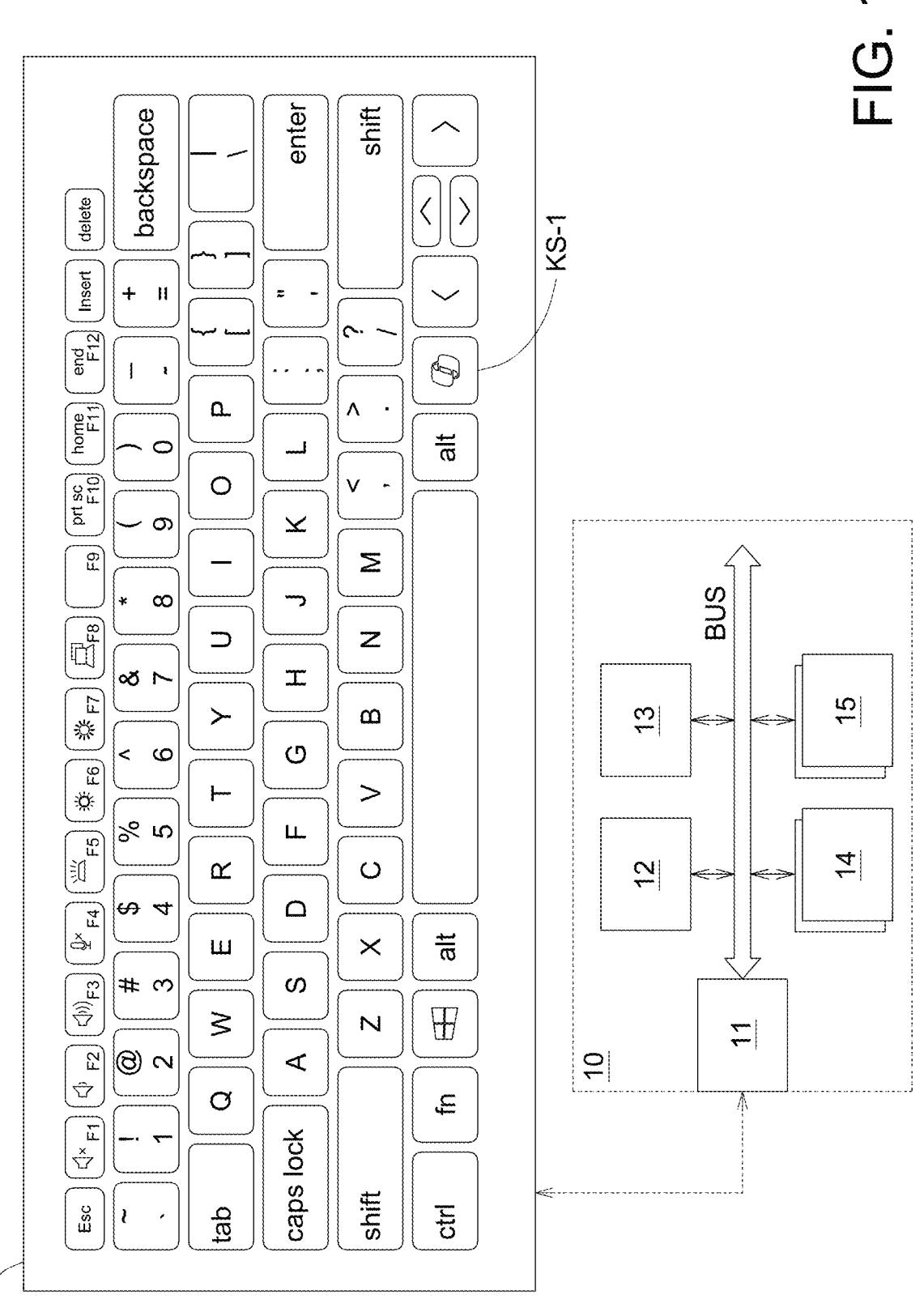
FIG. 12 is a system block diagram illustrating the connection architecture between the lighting keyboard, its specific function key, and the computing device.

Referring to FIG. 12, FIG. 12 is a system block diagram illustrating the connection architecture of between the lighting keyboard LKB, its specific function key KS-1, and a computing device.

As shown in FIG. 12, a computing device 10 may include an interface processor 11, storage media 12, fan 13, memory 14, and a computing unit 15, wherein the interface processor 11, the storage media 12, the fan 13, the memory 14 and the computing unit 15 can be connected via a bus. The lighting keyboard LKB can be connected to the computing device 10 via the interface processor 11. When the specific function key KS-1 of the lighting keyboard LKB is pressed, the AI-assisted function of the computing device 10 can be activated accordingly, thereby enhancing the computing performance. When the computing performance of the computing device 10 is enhanced, the performance of the computing unit 15, the usage of the memory 14, and the speed of the fan 13 are all increased. When the computing device 10 is externally connected to a graphics processing unit (GPU) or a network communication unit, or performs cloud computing, such configurations can also be regarded as computing units that further enhance the computing performance of the computing device 10. Software for AI-accelerated computing can be installed and operated on the computing device 10 or in the cloud.

As mentioned in the above, the present invention provides a backlight module for a specific function key on a lighting keyboard. As such, when a specific function of a computing device is activated, a light color can be displayed beneath the specific function key, allowing the user to easily recognize that the specific function is in an active state. Thus, the present invention provides a configuration of an embedded keyboard module in response to the specific function of the computing device.

In another aspect, in some embodiments, the backlight module of the lighting keyboard of the present invention can be configured to have a colored material layer, which can change the color of light after the light passes through the colored material layer, thereby enabling the lighting keyboard to present a special effect of colored light output. Referring to FIGS. 13A-13B, 14A-14B, 15A-15B, and 16A-16B, which illustrate lighting keyboards LKB according to multiple embodiments of the present invention, in which the lighting keyboards LKB have a design with the colored material layer.

Figure 13A:
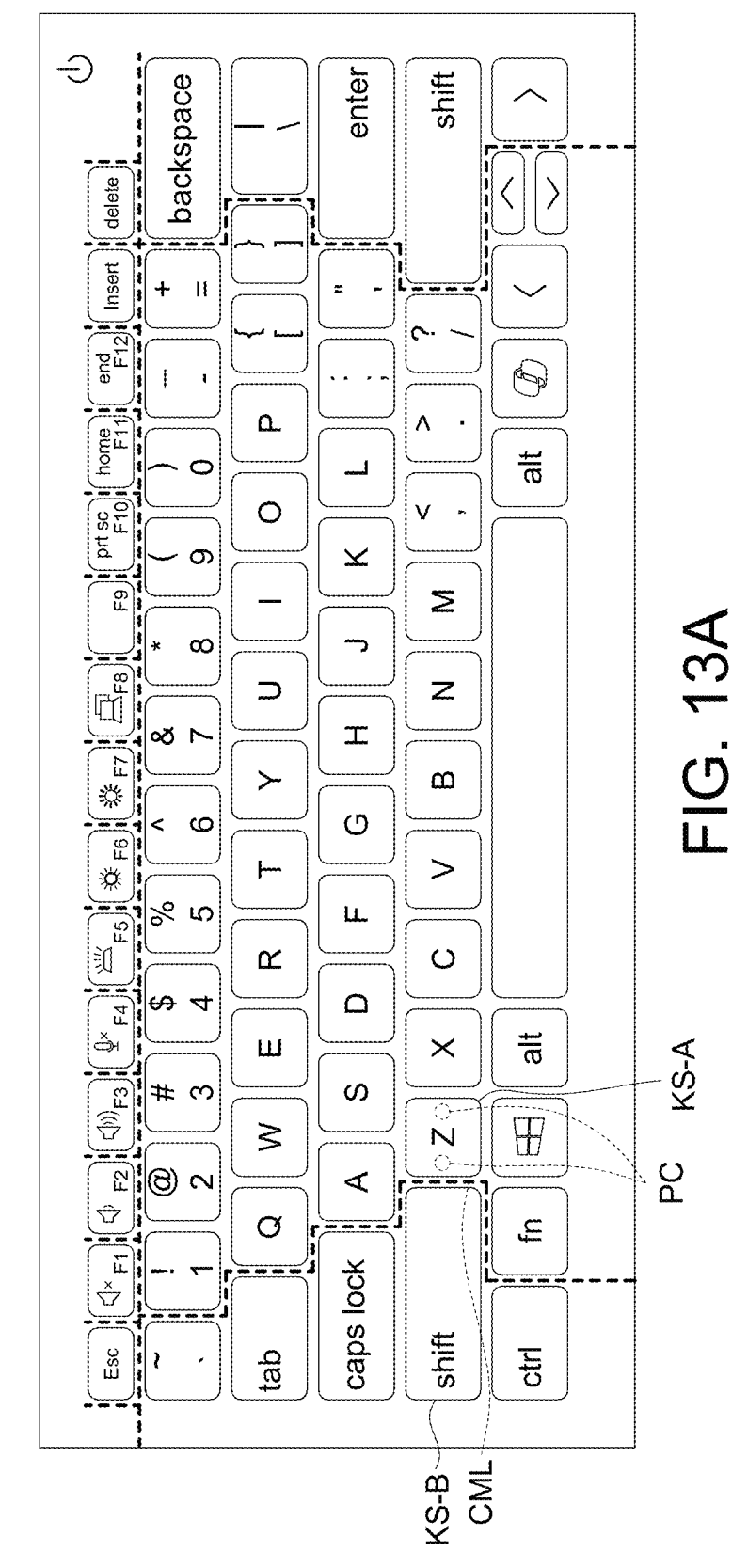
FIG. 13A is a top view illustrating a lighting keyboard according to another embodiment of the invention.
Figure 13B:
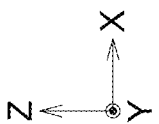
FIG. 13B is a partial sectional view of the lighting keyboard corresponding to the embodiment shown in FIG. 13A.

Referring to FIGS. 13A-13B, FIGS. 13A-13B illustrate one embodiment of the backlight module BLM of the lighting keyboard LKB having the colored material layer, wherein FIG. 13A is a top view of the lighting keyboard LKB of this embodiment, and FIG. 13B is a partial sectional view of the lighting keyboard LKB of this embodiment.

As shown in FIGS. 13A-13B, the lighting keyboard LKB may comprise a first key KS-A and a second key KS-B, with a gap region G between the first key KS-A and the second key KS-B. The first key KS-A may adopt the configuration of the heat-dissipating key KS described in the foregoing embodiments, and thus may also be referred to as a first heat-dissipating key. In this embodiment, the first key KS-A may, but is not limited to, being a square key, and the second key KS-B may, but is not limited to, be a multiple key (referring to FIG. 13A, the first key KS-A is, for example, Z key, and the second key KS-B is, for example, shift key adjacent to Z key). The first key KS-A and the second key KS-B can be disposed on the key circuit board MEM and the support plate SUP of the lighting keyboard LKB, with the backlight module BLM correspondingly disposed below them. The backlight module BLM is disposed below the key circuit board MEM and the support plate SUP and can include a shielding sheet SS, a light guide panel LGP, a reflective layer REF and a lighting board LCB that are stacked from top to bottom. The reflective layer REF can be disposed between the light guide panel LGP and the lighting board LCB. The lighting board LCB can include one or more light emitting units LED (e.g., light emitting diodes). In this embodiment, the light emitting units LED are disposed on one side of the first key KS-A and the second key KS-B (the right side in the view of FIG. 13B). The light from the light emitting units LED can be guided by the light guide panel LGP and reflected by the reflective layer REF toward the first key KS-A and the second key KS-B (toward the left in the view of FIG. 13B).

As shown in FIGS. 13A-13B, the backlight module BLM may have penetration channels PC corresponding to the lower side of the first key KS-A, so that the first key KS-A can serve as a heat-dissipating key and adopt at least some of the features of the heat-dissipating key KS shown in FIGS. 2-6. The penetration channels PC are respectively located on both sides of the first key KS-A and can serve as heat dissipation channels for the heat region HR. The shielding sheet SS can have light-reducing patterns LRP. In this embodiment, the light-reducing patterns LRP correspond to the first key KS-A and are located around the penetration channels PC for blocking light. In this embodiment, the light-reducing patterns LRP are annular black ink coated on an upper surface of the shielding sheet SS, but are not limited thereto. In other feasible embodiments, the light-reducing patterns LRP may also be coated on a lower surface of the shielding sheet SS.

As shown in FIGS. 13A-13B, the backlight module BLM can further have a colored material layer CML. As shown in FIG. 13A, the colored material layer CML (indicated by a bold dashed line) can correspond to the contour edges of the keys and the gaps between adjacent keys. It should be noted that FIG. 13A illustrates only one possible layout of the colored material layer CML of the lighting keyboard LKB and does not represent that the colored material layer CML can only be arranged in this way. Furthermore, as shown in FIG. 13B, the colored material layer CML vertically (i.e., in the stacking direction of the components of the backlight module BLM) overlaps with the gap region G. The colored material layer CML can be disposed on the shielding sheet SS or the light guide panel LGP. In this embodiment, the colored material layer CML is disposed on both the upper and lower surfaces of the light guide panel LGP. The colored material layer CML can be a colored ink layer (e.g., made of red, green or blue ink material) formed by a printing and coating process. In other feasible embodiments, the colored material layer CML can be disposed on the upper and/or lower surface of the shielding sheet SS and/or the light guide panel LGP, depending on implementation needs. As shown in FIG. 13B, the colored material layer CML also vertically overlaps with the shielding sheet SS and the support plate SUP.

Specifically, the shielding sheet SS can have the above-described opaque masking portion MP and the light transmitting portion TP having both reflective and translucent characteristics. The masking portion MP and the light transmitting portion TP are laminated. For example, the masking portion MP may be black ink, and the light transmitting portion TP may be white ink, but not limited thereto. In this embodiment, the colored material layer CML vertically overlaps with the light transmitting portion TP and the masking portion MP. Specifically, the support plate SUP can adopt the configuration shown in FIG. 3 and have a support frame Sf, which corresponds in position to the colored material layer CML. In this embodiment, the colored material layer CML vertically overlaps with the support frame Sf of the support plate SUP so that the colored material layer CML is hidden by the support frame Sf of the support plate SUP from a top view of the user.

In the embodiment shown in FIG. 13B, the light from the light emitting units LED can be guided by the light guide panel LGP to pass beside the light-reducing patterns LRP corresponding to the first key KS-A and form a first color light WL upward from the inner outlet KC0 of the keycap KCC of the first key KS-A, wherein the first color light WL is, for example, white light. In addition, the light from the light emitting units LED can also be guided by the light guide panel LGP to pass through the colored material layer CML and form a second color light CL, different from the first color light WL, upward from the inner outlet KC0 of the keycap KCC of the second key KS-B and from the boundary of the keycap KCC. That is, after the first color light WL passes through the colored material layer CML, its light color can be converted into the second color light CL. When the material of the colored material layer CML is selected as red/green/blue ink, the second color light CL corresponds to red/green/blue light. Thus, through the design of the colored material layer CML, the lighting keyboard LKB can present a light output effect of multiple color lights.

Figure 14A:
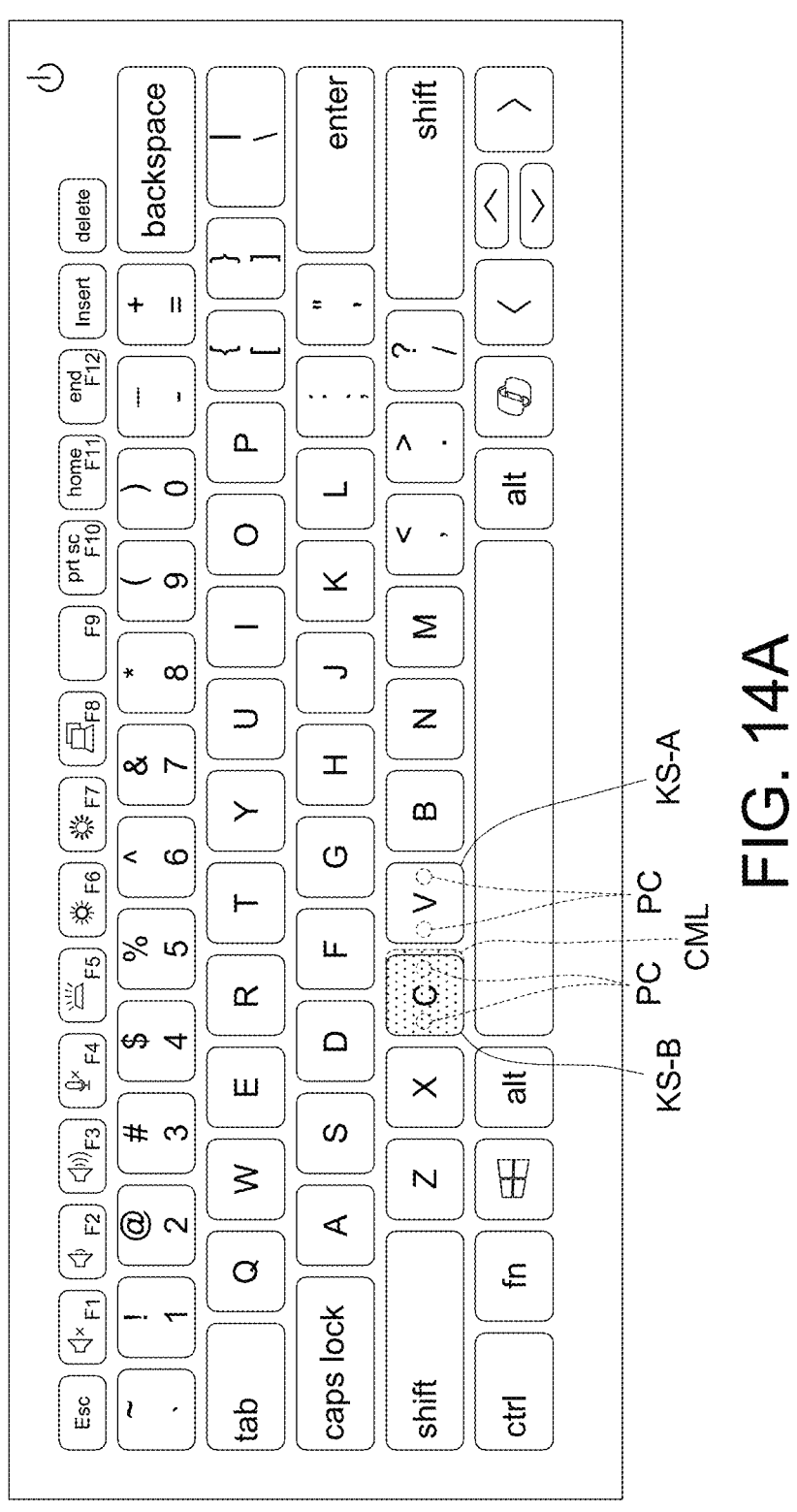
FIG. 14A is a top view illustrating a lighting keyboard according to another embodiment of the invention.
Figure 14B:
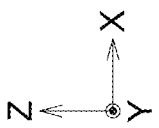
FIG. 14B is a partial sectional view of the lighting keyboard corresponding to the embodiment shown in FIG. 14A.

Referring to FIGS. 14A-14B, FIGS. 14A-14B illustrate another embodiment of the backlight module BLM of the lighting keyboard LKB having the colored material layer, wherein FIG. 14A is a top view of the lighting keyboard LKB of this embodiment, and FIG. 14B is a partial sectional view of the lighting keyboard LKB of this embodiment.

As shown in FIGS. 14A-14B, the lighting keyboard LKB may comprise a first key KS-A and a second key KS-B, with a gap region G between the first key KS-A and the second key KS-B. The first key KS-A and the second key KS-B may adopt the configuration of the heat-dissipating key KS described in the foregoing embodiments, and thus may also be referred to as a first heat-dissipating key and the second heat-dissipating key. In this embodiment, the first key KS-A and the second key KS-B may, but not limited to, both be square keys (referring to FIG. 14A, the first key KS-A is, for example, V key, and the second key KS-B is, for example, C key adjacent to V key). The first key KS-A and the second key KS-B can be disposed on the key circuit board MEM and the support plate SUP of the lighting keyboard LKB, with the backlight module BLM correspondingly disposed below them. The backlight module BLM is disposed below the key circuit board MEM and the support plate SUP and can include a shielding sheet SS, a light guide panel LGP, a reflective layer REF, and a lighting board LCB stacked from top to bottom. The reflective layer REF can be disposed between the light guide panel LGP and the lighting board LCB. The lighting board LCB can include one or more light emitting units LED. The light emitting units LED are disposed on one side of the first key KS-A and the second key KS-B (the right side in the view of FIG. 14B); the light from the light emitting units LED can be guided by the light guide panel LGP and reflected by the reflective layer REF toward the first key KS-A and the second key KS-B (toward the left in the view of FIG. 14B).

As shown in FIGS. 14A-14B, the backlight module BLM may have penetration channels PC respectively corresponding to the first key KS-A and the second key KS-B for serving as heat dissipation channels of the heat region HR, so that the first key KS-A and the second key KS-B can serve as heat-dissipating keys and adopt at least some of the features of the heat-dissipating key KS shown in FIGS. 2-6. That is, the backlight module BLM has the penetration channels PC symmetrically corresponding to the first key KS-A and the second key KS-B and penetrating through the lighting board LCB, the light guide panel LGP, and the shielding sheet SS. A periphery of each penetration channel PC is provided with light-reducing patterns LRP for blocking light, and diffusion patterns DP (shown in FIGS. 3-5) are disposed adjacent to the light-reducing patterns LRP to guide light to illuminate the first key KS-A and the second key KS-B. The light-reducing patterns LRP and the diffusion patterns DP (shown in FIGS. 3-5) form a heat-reducing optical pattern group, and the heat-reducing optical pattern groups respectively corresponding to the first key KS-A and the second key KS-B have identical patterns.

As shown in FIGS. 14A-14B, the backlight module BLM can further have a colored material layer CML. As shown in FIG. 14A, the colored material layer CML (indicated by hatching) can correspond to the keycap projection area of the keys. It should be noted that FIG. 14A illustrates the colored material layer CML in a key block of the C key and V key on the lighting keyboard LKB as an example, but does not represent that the colored material layer CML is only arranged in this key block. Furthermore, as shown in FIG. 14B, the colored material layer CML substantially overlaps with the second key KS-B in the vertical direction. Furthermore, the colored material layer CML vertically overlaps with the inner outlet KC0 of the keycap KCC of the second key KS-B. Moreover, the colored material layer CML partially overlaps with the gap region G in the vertical direction (i.e., the stacking direction of the components of the backlight module BLM) so that the light from the light emitting units LED can pass through the colored material layer CML earlier to change its light color. The colored material layer CML can be disposed on the shielding sheet SS or the light guide panel LGP. In this embodiment, the colored material layer CML is disposed on both the upper and lower surfaces of the light guide panel LGP. The colored material layer CML can be a colored ink layer (e.g., made of red, green or blue ink material) formed by a printing and coating process. In other feasible embodiments, the colored material layer CML can be disposed on the upper and/or lower surface of the shielding sheet SS and/or the light guide panel LGP, depending on implementation needs.

Specifically, the shielding sheet SS can adopt the configuration shown in FIG. 3 and have a shielding frame SSF. As shown in FIG. 14B, the shielding sheet SS defines a light transmitting area TA by the shielding frame SSF (shown in FIG. 3), and the colored material layer CML substantially overlaps with the light transmitting area TA in the vertical direction. In addition, as shown in FIG. 14B, the colored material layer CML partially overlaps with the shielding sheet SS and the support plate SUP in the vertical direction. Specifically, the shielding sheet SS can have the above-described opaque masking portion MP and the light transmitting portion TP having both reflective and translucent characteristics. The masking portion MP and the light transmitting portion TP are laminated. For example, the masking portion MP may be black ink, and the light transmitting portion TP may be white ink, but not limited thereto. The light transmitting area TA is defined in the region surrounded by the light transmitting portion TP and the masking portion MP. In this embodiment, the colored material layer CML partially overlaps with the light transmitting portion TP and the masking portion MP in the vertical direction. Specifically, the support plate SUP can adopt the configuration shown in FIG. 3 and have a support frame Sf. In this embodiment, the colored material layer CML partially overlaps with the support frame Sf of the support plate SUP in the vertical direction so that the periphery of the colored material layer CML is hidden by the support frame Sf of the support plate SUP from the top view of the user. The support frame Sf of the support plate SUP has a plurality of support plate holes SUPH. In this embodiment, the colored material layer CML vertically overlaps with these support plate holes SUPH.

In the embodiment shown in FIG. 14B, a light from the light emitting units LED can be guided by the light guide panel LGP to pass beside the light-reducing patterns LRP corresponding to the first key KS-A and form a first color light WL upward from the inner outlet KC0 of the keycap KCC of the first key KS-A, wherein the first color light WL is, for example, white light. In addition, the light from the light emitting units LED can also be guided by the light guide panel LGP to pass through the colored material layer CML, pass beside the light-reducing patterns LRP corresponding to the second key KS-B, and form a second color light CL, different from the first color light WL, upward from the inner outlet KC0 of the keycap KCC of the second key KS-B and from the boundary of the keycap KCC. That is, after the first color light WL passes through the colored material layer CML, its light color can be converted into the second color light CL. When the material of the colored material layer CML is selected as red/green/blue ink, the second color light CL corresponds to red/green/blue light. Thus, through the design of the colored material layer CML, the lighting keyboard LKB can present a light output effect of multiple color lights.

Figure 15A:
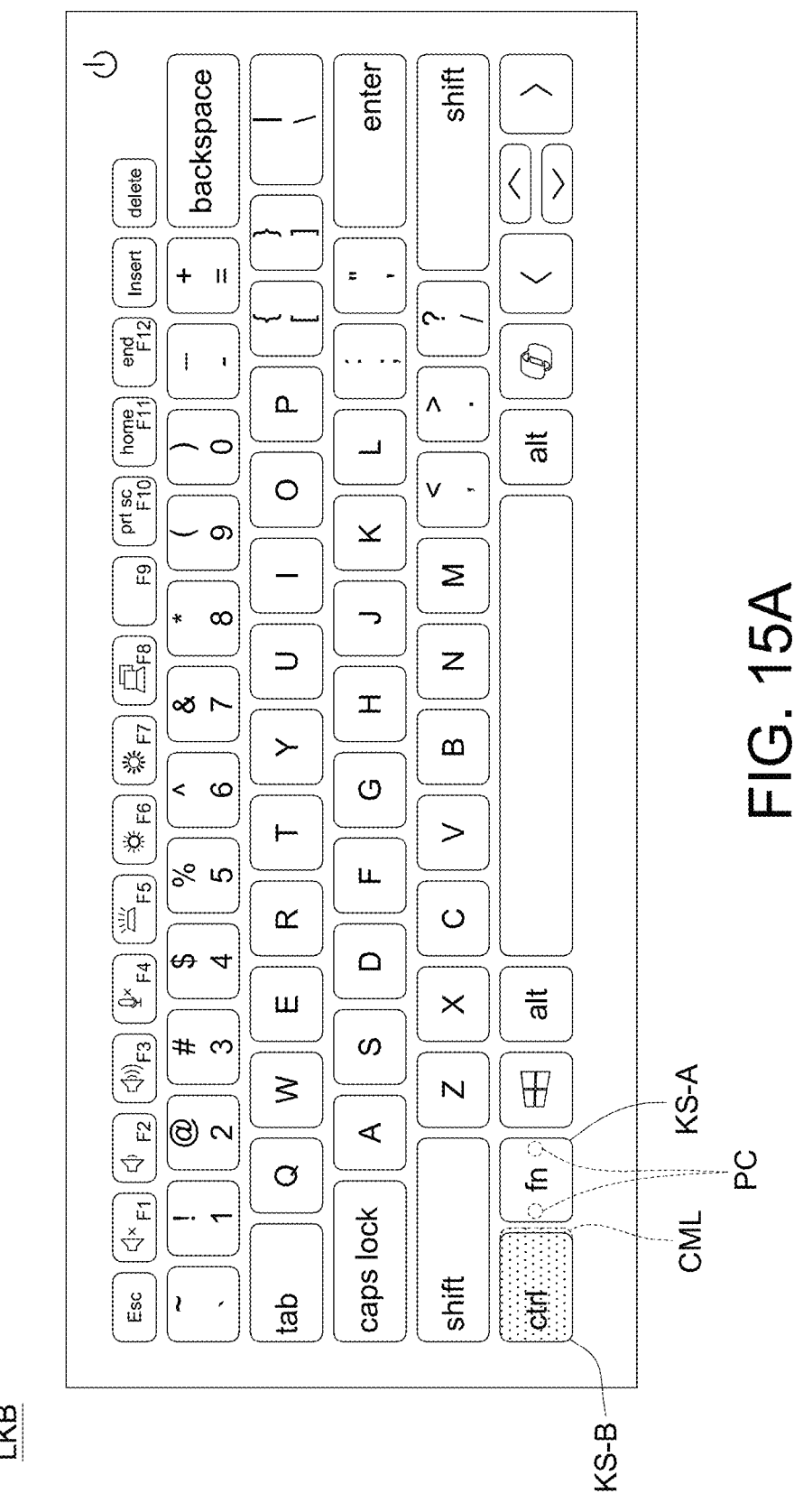
FIG. 15A is a top view illustrating a lighting keyboard according to another embodiment of the invention.
Figure 15B:
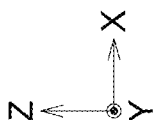
FIG. 15B is a partial sectional view of the lighting keyboard corresponding to the embodiment shown in FIG. 15A.

Referring to FIGS. 15A-15B, FIGS. 15A-15B illustrate another embodiment of the backlight module BLM of the lighting keyboard LKB having the colored material layer. FIG. 15A is a top view of the lighting keyboard LKB in this embodiment, and FIG. 15B is a partial sectional view of the lighting keyboard LKB in this embodiment.

As shown in FIGS. 15A-15B, the lighting keyboard LKB may comprise a first key KS-A and a second key KS-B, with a gap region G between the first key KS-A and the second key KS-B. The first key KS-A may adopt the configuration of the heat-dissipating key KS described in the foregoing embodiments and thus may also be referred to as a first heat-dissipating key. In this embodiment, the first key KS-A may, but not limited to, be a square key; the second key KS-B may, but not limited to, be a multiple key (for example, in FIG. 15A, the first key KS-A is fn key, and the second key KS-B is ctrl key adjacent to fn key). The first key KS-A and second key KS-B are disposed on the key circuit board MEM and the support plate SUP, with the backlight module BLM correspondingly disposed below them. The backlight module BLM is disposed below the key circuit board MEM and support plate SUP and can include a shielding sheet SS, a light guide panel LGP, a reflective layer REF and a lighting board LCB that are stacked from top to bottom. The reflective layer REF is disposed between the light guide panel LGP and the lighting board LCB. The lighting board LCB may include one or more light emitting units LED. The light emitting units LED are disposed on one side of the first key KS-A and second key KS-B (the right side in the view of FIG. 15B). The light from the light emitting units LED can be guided by the light guide panel LGP and reflected by the reflective layer REF toward the first key KS-A and the second key KS-B (toward the left in FIG. 15B).

As shown in FIGS. 15A-15B, the backlight module BLM may have penetration channels PC below the first key KS-A, allowing the first key to serve as a heat-dissipating key and adopt at least some of the features the features of the heat-dissipating key KS shown in FIGS. 2-6. The penetration channels PC are respectively located on both sides of the first key KS-A and can serve as heat dissipation channels for the heat region HR. The shielding sheet SS can have light-reducing patterns LRP. In this embodiment, the light-reducing patterns LRP are annular black ink coated on an upper surface of the shielding sheet SS, but are not limited thereto. In other feasible embodiments, the light-reducing patterns LRP may also be coated on a lower surface of the shielding sheet SS.

As shown in FIGS. 15A-15B, the backlight module BLM can further include a colored material layer CML. As shown in FIG. 15A, the colored material layer CML (indicated by hatching) can correspond to the keycap projection area of the keys. It should be noted that FIG. 15A illustrates the colored material layer CML in a key block of the fn key and ctrl key on the lighting keyboard LKB as an example, but does not represent that the colored material layer CML is only arranged in this key block. Furthermore, as shown in FIG. 15B, the colored material layer CML substantially overlaps with the second key KS-B in the vertical direction. Furthermore, the colored material layer CML vertically overlaps with the inner outlet KC0 of the second key KS-B. Additionally, the colored material layer CML partially overlaps with the gap region G in the vertical direction (i.e., the stacking direction of the components of the backlight module BLM), so that the light from the light emitting units LED can pass through the colored material layer CML earlier to change its light color. The colored material layer CML may be disposed on the shielding sheet SS or the light guide panel LGP. In this embodiment, the colored material layer CML is disposed on both the upper and lower surfaces of the light guide panel LGP. The colored material layer CML may be a colored ink layer (e.g., made of red, green or blue ink material) formed by a printing and coating process. In other feasible embodiments, the colored material layer CML can be disposed on the upper and/or lower surfaces of the shielding sheet SS and/or the light guide panel LGP, depending on implementation needs.

Specifically, the shielding sheet SS can adopt the configuration shown in FIG. 3 and have a shielding frame SSF. As shown in FIG. 15B, the shielding sheet SS defines a light transmitting area TA by the shielding frame SSF (shown in FIG. 3), and the colored material layer CML substantially overlaps with the light transmitting area TA in the vertical direction. As shown in FIG. 15B, the colored material layer CML partially overlaps with the shielding sheet SS and the support plate SUP in the vertical direction. Specifically, the shielding sheet SS can have the above-described opaque masking portion MP and the light transmitting portion TP having both reflective and translucent characteristics. The masking portion MP and the light transmitting portion TP are laminated. For example, the masking portion MP may be black ink, and the light transmitting portion TP may be white ink, but not limited thereto. The light transmitting area TA is defined in the region surrounded by the light transmitting portion TP and the masking portion MP. In this embodiment, the colored material layer CML partially overlaps with the light transmitting portion TP and the masking portion MP in the vertical direction. Specifically, the support plate SUP can adopt the configuration shown in FIG. 3 and have a support frame Sf. In this embodiment, the colored material layer CML partially overlaps with the support frame Sf of the support plate SUP in the vertical direction so that the periphery of the colored material layer CML is hidden by the support frame Sf of the support plate SUP from the top view of the user. The support frame Sf of the support plate SUP has a plurality of support plate holes SUPH. In this embodiment, the colored material layer CML vertically overlaps with these support plate holes SUPH.

In the embodiment shown in FIG. 15B, a light from the light emitting units LED can be guided by the light guide panel LGP to pass beside the light-reducing patterns LRP corresponding to the first key KS-A and form a first color light WL upward from the inner outlet KC0 of the keycap KCC of the first key KS-A, wherein the first color light WL is, for example, white light. In addition, the light from the light emitting units LED can also be guided by the light guide panel LGP to pass through the colored material layer CML and form a second color light CL, different from the first color light WL, upward from the inner outlet KC0 of the keycap KCC of the second key KS-B. That is, after the first color light WL passes through the colored material layer CML, its light color can be converted into the second color light CL. Further, the light from the light emitting units LED can also be guided by the light guide panel LGP to pass through the colored material layer CML and form the second color light CL upward from the boundary of the keycap KCC of the second key KS-B. When the material of the colored material layer CML is selected as red/green/blue ink, the second color light CL corresponds to red/green/blue light. Thus, through the design of the colored material layer CML, the lighting keyboard LKB can present a light output effect of multiple color lights.

Figure 16A:
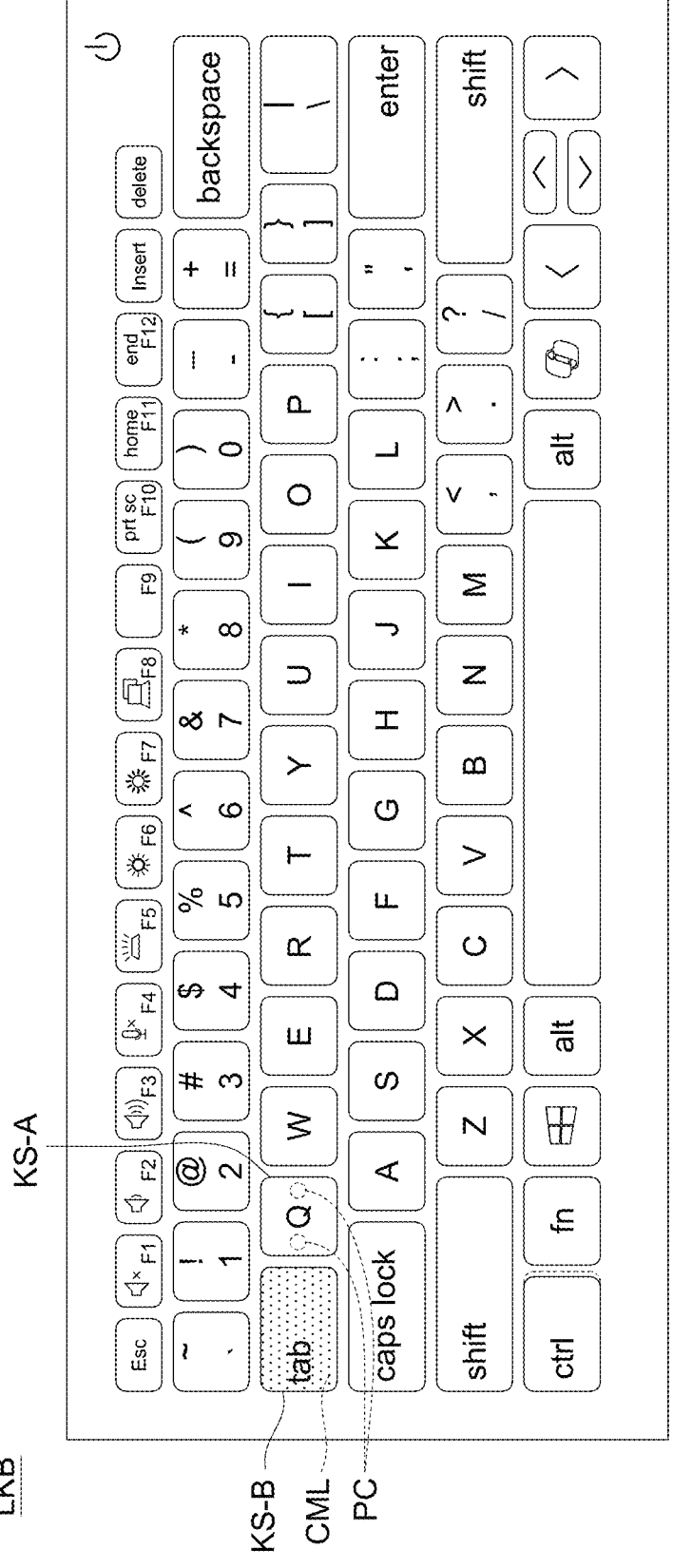
FIG. 16A is a top view illustrating a lighting keyboard according to another embodiment of the invention.
Figure 16B:
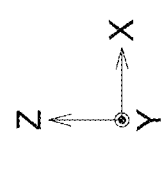
FIG. 16B is a partial sectional view of the lighting keyboard corresponding to the embodiment shown in FIG. 16A.

Referring to FIGS. 16A-16B, FIGS. 16A-16B illustrate yet another embodiment of the backlight module BLM of the lighting keyboard LKB having the colored material layer, wherein FIG. 16A is a top view of the lighting keyboard LKB of this embodiment, and FIG. 16B is a partial sectional view of the lighting keyboard LKB of this embodiment.

As shown in FIGS. 16A-16B, the lighting keyboard LKB may comprise a first key KS-A and a second key KS-B, with a gap region G between the first key KS-A and the second key KS-B. The first key KS-A may adopt the configuration of the heat-dissipating key KS described in the foregoing embodiments, and thus may also be referred to as a first heat-dissipating key. In this embodiment, the first key KS-A may, but is not limited to, being a square key, and the second key KS-B may, but is not limited to, be a multiple key (referring to FIG. 16A, the first key KS-A is, for example, Q key, and the second key KS-B is, for example, tab key adjacent to Q key). The first key KS-A and the second key KS-B can be disposed on the key circuit board MEM and the support plate SUP of the lighting keyboard LKB, with the backlight module BLM correspondingly disposed below them. The backlight module BLM is disposed below the key circuit board MEM and the support plate SUP and can include a shielding sheet SS, a light guide panel LGP, a reflective layer REF and a lighting board LCB that are stacked from top to bottom. The reflective layer REF can be disposed between the light guide panel LGP and the lighting board LCB. The lighting board LCB can include one or more light emitting units LED. The light emitting units LED are disposed on one side of the first key KS-A and the second key KS-B (the right side in the view of FIG. 16B). The light from the light emitting units LED can be guided by the light guide panel LGP and reflected by the reflective layer REF toward the first key KS-A and the second key KS-B (toward the left in the view of FIG. 16B).

As shown in FIGS. 16A-16B, the backlight module BLM can further have a colored material layer CML. As shown in FIG. 16A, the colored material layer CML (indicated by hatching) can correspond to the keycap projection area of the keys. It should be noted that FIG. 16A illustrates the colored material layer CML in a key block of the Q key and tab key on the lighting keyboard LKB as an example, but does not represent that the colored material layer CML is only arranged in this key block. Further, as shown in FIG. 16B, the colored material layer CML substantially overlaps with the second key KS-B in the vertical direction. Furthermore, the colored material layer CML vertically overlaps with the inner outlet KC0 of the second key KS-B. In this embodiment, the colored material layer CML is disposed on the upper surface of the key circuit board MEM; that is, the colored material layer CML is disposed above the backlight module BLM and located between the support plate SUP and the keycap KCC. The colored material layer CML can be a colored ink layer (e.g., made of red, green or blue ink material) formed by a printing and coating process. In other feasible embodiments, the colored material layer CML can be disposed on the lower surface of the key circuit board MEM, depending on implementation needs.

Specifically, the shielding sheet SS can have the above-described opaque masking portion MP and the light transmitting portion TP having both reflective and translucent characteristics. For example, the masking portion MP may be black ink, and the light transmitting portion TP may be white ink, but not limited thereto. Specifically, the shielding sheet SS can adopt the configuration shown in FIG. 3 and have a shielding frame SSF, that is, the mask portion MP and the light transmitting portion TP can be laminated to form the light-shielding frame SSF. The shielding sheet SS defines a light transmitting area TA by the shielding frame SSF (shown in FIG. 3). The light transmitting area TA is defined in the region surrounded by the light transmitting portion TP and the masking portion MP. In this embodiment, the colored material layer CML substantially overlaps with the light transmitting area TA in the vertical direction. Specifically, the support plate SUP can adopt the configuration shown in FIG. 3 and have a support frame Sf. The support frame Sf of the support plate SUP has a plurality of support plate holes SUPH. In this embodiment, the colored material layer CML vertically overlaps with these support plate holes SUPH.

In the embodiment shown in FIG. 16B, a light from the light emitting units LED can be guided by the light guide panel LGP to pass beside the light-reducing patterns LRP corresponding to the first key KS-A and form a first color light WL upward from the inner outlet KC0 of the keycap KCC of the first key KS-A, wherein the first color light WL is, for example, white light. In addition, the light from the light emitting units LED can also be guided by the light guide panel LGP to pass through the light transmitting area TA and the support plate holes SUPH, then pass through the colored material layer CML on the key circuit board MEM and form a second color light CL, different from the first color light WL, upward from the inner outlet KC0 of the keycap KCC of the second key KS-B. That is, after the first color light WL passes through the colored material layer CML, its light color can be converted into the second color light CL. Further, the light from the light emitting units LED can also be guided by the light guide panel LGP to pass through the colored material layer CML and form the second color light CL upward from the boundary of the keycap KCC of the second key KS-B. When the material of the colored material layer CML is selected as red/green/blue ink, the second color light CL corresponds to red/green/blue light. Thus, through the design of the colored material layer CML, the lighting keyboard LKB can present a light output effect of multiple color lights.

In summary, the present invention provides a colored material coating for the backlight module corresponding to certain keys on a lighting keyboard. Thus, when a light from a single light emitting unit of the backlight module passes through this colored material coating, its color changes, thereby enabling the lighting keyboard to have a special colored light-output effect without having to provide multiple light emitting units for emitting different colors within the keyboard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module for a lighting keyboard, wherein the lighting keyboard comprises a first key and a second key, with a gap region between the first key and the second key, and the backlight module comprises:

a lighting board having a light emitting unit;

a light guide panel; and a shielding sheet, wherein the shielding sheet, the light guide panel and the lighting board are stacked from top to bottom, and the shielding sheet has a light-reducing pattern corresponding to the first key for blocking light;

wherein, the backlight module has a colored material layer disposed on the shielding sheet or the light guide panel and overlapping with the gap region in a vertical direction; a light of the light emitting unit is guided by the light guide panel to pass through a side of the light-reducing pattern and form a first color light upward from an inner outlet of the first key; the light of the light emitting unit is further guided by the light guide panel to pass through the colored material layer and form a second color light different from the first color light upward from an inner outlet and a boundary of the second key.

2. The backlight module for the lighting keyboard according to claim 1, wherein the shielding sheet has a light transmitting portion and a masking portion, the light transmitting portion and the masking portion are laminated, and the colored material layer vertically overlaps with both the light transmitting portion and the masking portion.

3. The backlight module for the lighting keyboard according to claim 1, wherein the first key and the second key are disposed on a support plate of the lighting keyboard, the backlight module is disposed below the support plate, and the colored material layer vertically overlaps with a support frame of the support plate.

4. The backlight module for the lighting keyboard according to claim 1, wherein the colored material layer is formed on an upper surface or a lower surface of the shielding sheet.

5. The backlight module for the lighting keyboard according to claim 1, wherein the colored material layer is formed on an upper surface or a lower surface of the light guide panel.

6. A backlight module for a lighting keyboard, the lighting keyboard comprising a first key and a second key, the backlight module comprising:

a lighting board having an light emitting unit;

a light guide panel; and a shielding sheet, wherein the lighting board, the light guide panel, and the shielding sheet are stacked from top to bottom;

wherein, the backlight module has at least two penetration channels respectively and symmetrically corresponding to the first key and the second key and penetrating the lighting board, the light guide panel and the shielding sheet; a periphery of each of at least two penetration channels is provided with one light-reducing pattern for blocking light; at least two diffusion patterns are disposed adjacent to the at least two light-reducing patterns to guide light to illuminate the first key and the second key; the at least two light-reducing patterns and the at least two diffusion patterns respectively form at least two heat-reducing optical pattern groups; and the at least two heat-reducing optical pattern groups respectively corresponding to the first key and the second key have identical patterns;

wherein, the backlight module has a colored material layer disposed on the shielding sheet or the light guide panel and vertically overlapping with the second key; a light from the light emitting unit is guided by the light guide panel to pass through a side of the light-reducing pattern corresponding to the first key and form a first color light upward from an inner outlet of the first key; and the light from the light emitting unit is further guided by the light guide panel to pass through the colored material layer and a side of the light-reducing pattern corresponding to the second key and form a second color light different from the first color light upward from an inner outlet and a boundary of the second key.

7. The backlight module for the lighting keyboard according to claim 6, wherein the shielding sheet has a shielding frame defining a light transmitting region, and the colored material layer vertically overlaps the light transmitting region.

8. The backlight module for the lighting keyboard according to claim 6, wherein the colored material layer vertically overlaps with an inner outlet of the second key.

9. The backlight module for the lighting keyboard according to claim 6, wherein the first key and the second key are disposed on a support plate of the lighting keyboard, the backlight module is disposed below the support plate, the support plate has a plurality of support plate holes, and the colored material layer vertically overlaps with the support plate holes.

10. The backlight module for the lighting keyboard according to claim 6, wherein the shielding sheet has a light transmitting portion and a masking portion, the light transmitting portion and the masking portion are laminated, and the colored material layer vertically overlaps with the light transmitting portion and the masking portion.

11. The backlight module for the lighting keyboard according to claim 6, wherein the first key and the second key are disposed on a support plate of the lighting keyboard, the backlight module is disposed below the support plate, and the colored material layer vertically overlaps with a support frame of the support plate.

12. The backlight module for the lighting keyboard according to claim 6, wherein the colored material layer is formed on an upper surface or a lower surface of the shielding sheet.

13. The backlight module for the lighting keyboard according to claim 6, wherein the colored material layer is formed on an upper surface or a lower surface of the light guide panel.

14. A backlight module for a lighting keyboard, the lighting keyboard comprising a first key and a second key, the backlight module comprising:

a lighting board having an light emitting unit;

a light guide panel; and a shielding sheet, wherein the shielding sheet, the light guide panel, and the lighting board are stacked from top to bottom, and the shielding sheet has a light-reducing pattern corresponding to the first key for blocking light;

wherein, the backlight module has a colored material layer vertically overlapping with the second key; a light from the light emitting unit is guided by the light guide panel to pass through a side of the light-reducing pattern and form a first color light upward from an inner outlet of the first key; and the light from the light emitting unit is further guided by the light guide panel to pass through the colored material layer and form a second color light different from the first color light upward from an inner outlet of the second key.

15. The backlight module for the lighting keyboard according to claim 14, wherein light from the light emitting unit is guided by the light guide panel to pass through the colored material layer and be emitted upward as the second color light from a boundary of the second key.

16. The backlight module for the lighting keyboard according to claim 14, wherein the shielding sheet has a shielding frame defining a light transmitting region, and the colored material layer vertically overlaps with the light transmitting region.

17. The backlight module for the lighting keyboard according to claim 14, wherein the colored material layer vertically overlaps with an inner outlet of the second key.

18. The backlight module for the lighting keyboard according to claim 14, wherein the first key and the second key are disposed on a support plate of the lighting keyboard, the backlight module is disposed below the support plate, the support plate has a support frame and a plurality of support plate holes, and the colored material layer vertically overlaps with the support frame and the support plate holes.

19. The backlight module for the lighting keyboard according to claim 14, wherein the shielding sheet has a light transmitting portion and a masking portion, the light transmitting portion and the masking portion being laminated, and the colored material layer vertically overlaps with the light transmitting portion and the masking portion.

20. The backlight module for the lighting keyboard according to claim 14, wherein the first key and the second key are disposed on a key circuit board of the lighting keyboard, and the colored material layer is disposed on the key circuit board.

* * * * *